(12) United States Patent
Oberst

(10) Patent No.: US 7,653,936 B2
(45) Date of Patent: *Jan. 26, 2010

(54) DISTRIBUTED EXPRESSION-BASED ACCESS CONTROL

(75) Inventor: Shawn Oberst, Maple Valley, WA (US)

(73) Assignee: Microsoft Corporation, Redmond, WA (US)

(*) Notice: Subject to any disclaimer, the term of this patent is extended or adjusted under 35 U.S.C. 154(b) by 1125 days.

This patent is subject to a terminal disclaimer.

(21) Appl. No.: 10/606,624

(22) Filed: Jun. 25, 2003

(65) Prior Publication Data

US 2004/0268146 A1    Dec. 30, 2004

(51) Int. Cl.
*G06F 7/04* (2006.01)
*G06F 15/16* (2006.01)
*G06F 17/30* (2006.01)
*H04L 29/06* (2006.01)

(52) U.S. Cl. .............................. 726/7; 726/6; 713/166; 713/167

(58) Field of Classification Search ............... 726/6, 726/7; 713/166, 167
See application file for complete search history.

(56) References Cited

U.S. PATENT DOCUMENTS

| | | | | |
|---|---|---|---|---|
| 5,649,099 A | * | 7/1997 | Theimer et al. | 726/4 |
| 5,918,015 A | * | 6/1999 | Suzuki et al. | 709/219 |
| 6,023,765 A | * | 2/2000 | Kuhn | 726/4 |
| 6,044,466 A | * | 3/2000 | Anand et al. | 726/1 |
| 6,047,377 A | * | 4/2000 | Gong | 726/21 |
| 6,138,238 A | * | 10/2000 | Scheifler et al. | 726/17 |
| 6,192,476 B1 | * | 2/2001 | Gong | 726/4 |
| 6,202,066 B1 | * | 3/2001 | Barkley et al. | 707/9 |
| 6,279,111 B1 | * | 8/2001 | Jensenworth et al. | 726/10 |
| 6,389,540 B1 | * | 5/2002 | Scheifler et al. | 726/21 |
| 6,397,336 B2 | * | 5/2002 | Leppek | 726/4 |
| 6,412,070 B1 | * | 6/2002 | Van Dyke et al. | 726/17 |
| 6,427,228 B1 | * | 7/2002 | Wigger | 717/111 |
| 6,754,884 B1 | * | 6/2004 | Lucas et al. | 717/108 |
| 6,772,350 B1 | * | 8/2004 | Belani et al. | 726/2 |
| 6,944,777 B1 | * | 9/2005 | Belani et al. | 713/150 |
| 6,947,989 B2 | * | 9/2005 | Gullotta et al. | 709/226 |
| 6,985,955 B2 | * | 1/2006 | Gullotta et al. | 709/229 |

(Continued)

OTHER PUBLICATIONS

Sirer, E. G. and Wang, K. 2002. An access control language for web services. In Proceedings of the Seventh ACM Symposium on Access Control Models and Technologies (Monterey, California, USA, Jun. 3-4, 2002). SACMAT '02. ACM Press, New York, NY, 23-30. DOI=http://doi.acm.org/10.1145/507711.507715.*

(Continued)

*Primary Examiner*—David Garcia Cervetti
(74) *Attorney, Agent, or Firm*—Vierra Magen Marcus & DeNiro LLP

(57) ABSTRACT

A distributed access control technique assigns permission to a user without permission explosion, thereby facilitating the system administration of user access to a piece of content represented by a Web service. Permissions are granted to pieces of content through expressions rather than explicitly coupled between a piece of content and a user. Each expression defines an access scope for either a user or a piece of content. An expression defining the access scope for a user can be created and maintained independently of an expression defining the access scope to a piece of content, hence simplifying management information system implementation and administration.

13 Claims, 24 Drawing Sheets

U.S. PATENT DOCUMENTS

| | | | |
|---|---|---|---|
| 7,080,384 B2* | 7/2006 | Wall et al. | 719/316 |
| 7,117,448 B2* | 10/2006 | Cooper et al. | 715/764 |
| 7,305,432 B2* | 12/2007 | Feng et al. | 709/203 |
| 7,359,884 B2* | 4/2008 | Ta et al. | 705/59 |
| 2002/0062451 A1* | 5/2002 | Scheidt et al. | 713/201 |
| 2002/0147801 A1* | 10/2002 | Gullotta et al. | 709/223 |
| 2002/0157023 A1* | 10/2002 | Callahan et al. | 713/201 |
| 2003/0079120 A1* | 4/2003 | Hearn et al. | 713/150 |
| 2003/0084324 A1* | 5/2003 | Koved et al. | 713/200 |
| 2003/0084325 A1* | 5/2003 | Koved et al. | 713/200 |
| 2003/0154403 A1* | 8/2003 | Keinsley et al. | 713/201 |
| 2003/0163479 A1* | 8/2003 | Mathews et al. | 707/102 |
| 2003/0196108 A1* | 10/2003 | Kung | 713/200 |
| 2003/0208378 A1* | 11/2003 | Thangaraj et al. | 705/2 |
| 2004/0019546 A1* | 1/2004 | Ta et al. | 705/35 |
| 2004/0064528 A1* | 4/2004 | Meredith et al. | 709/219 |
| 2004/0083243 A1* | 4/2004 | Feng et al. | 707/203 |
| 2004/0103339 A1* | 5/2004 | Chalasani et al. | 714/4 |
| 2004/0139319 A1* | 7/2004 | Favazza et al. | 713/168 |
| 2004/0181453 A1* | 9/2004 | Ray et al. | 705/16 |
| 2004/0193909 A1* | 9/2004 | Chang et al. | 713/200 |
| 2004/0267746 A1* | 12/2004 | Marcjan et al. | 707/8 |
| 2005/0015491 A1* | 1/2005 | Koeppel | 709/226 |
| 2005/0273772 A1* | 12/2005 | Matsakis et al. | 717/136 |
| 2006/0101071 A1* | 5/2006 | Henderson | 707/104.1 |

OTHER PUBLICATIONS

Chandramouli, R. 2000. Application of XML tools for enterprise-wide RBAC implementation tasks. In Proceedings of the Fifth ACM Workshop on Role-Based Access Control (Berlin, Germany, Jul. 26-28, 2000). RBAC '00. ACM Press, New York, NY, 11-18. DOI=http://doi.acm.org/10.1145/344287.344297.*

Park, J. S. and Hwang, J. 2003. Role-based access control for collaborative enterprise in peer-to-peer computing environments. In Proceedings of the Eighth ACM Symposium on Access Control Models and Technologies (Como, Italy, Jun. 2-3, 2003). SACMAT '03. ACM Press, New York, NY, 93-99. DOI=http://doi.acm.org/10.1145/775412.775424.*

* cited by examiner

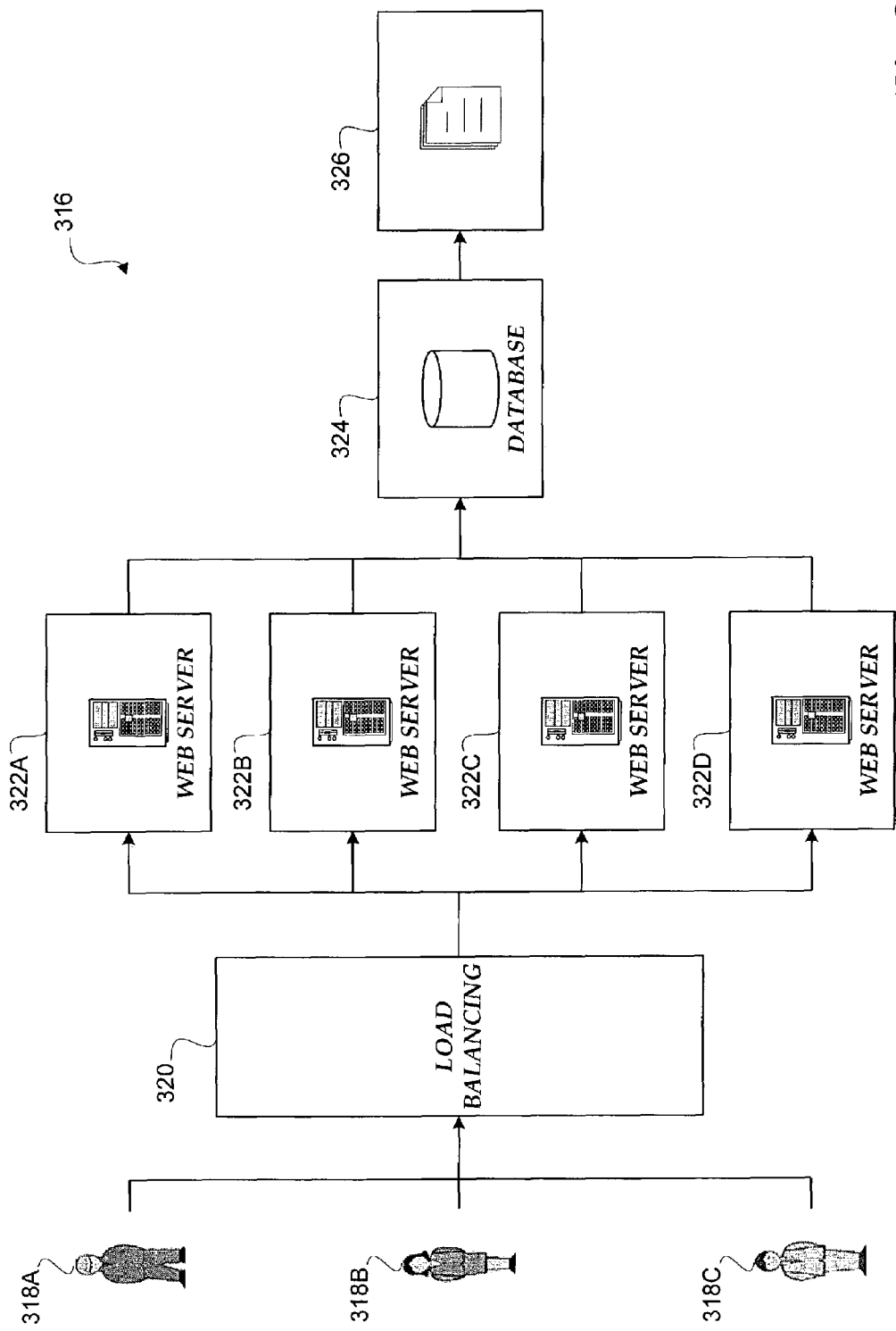

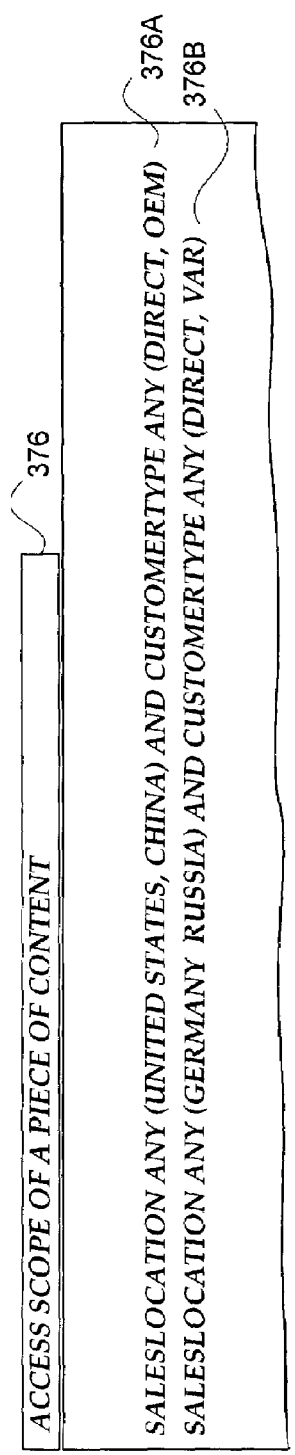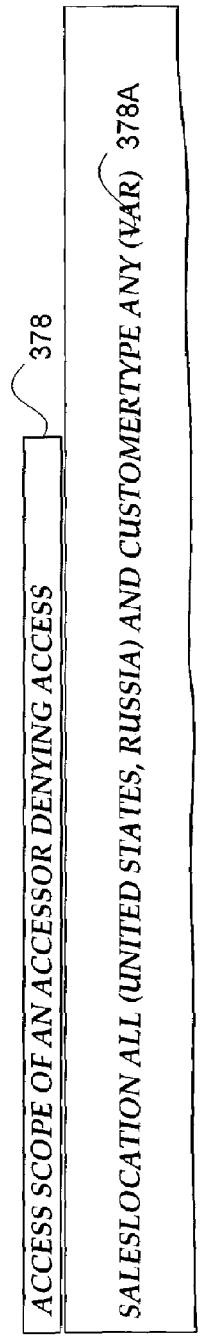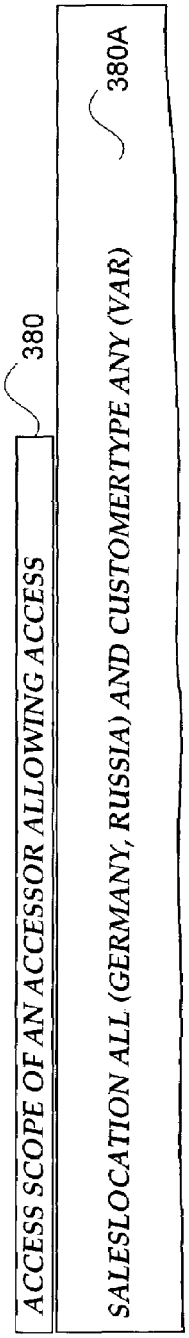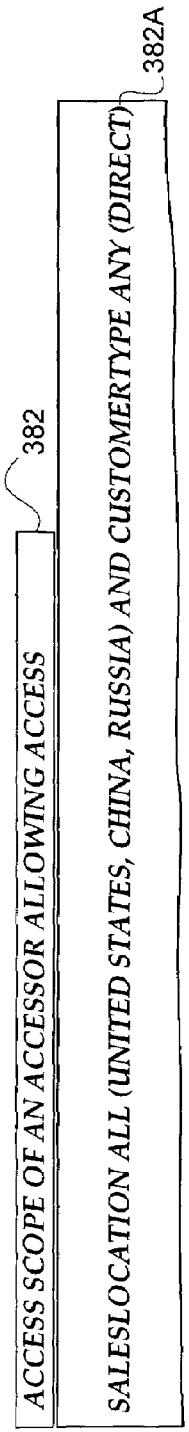

Fig.3H.  376 ACCESS SCOPE OF A PIECE OF CONTENT
376A SALESLOCATION ANY (UNITED STATES, CHINA) AND CUSTOMERTYPE ANY (DIRECT, OEM)
376B SALESLOCATION ANY (GERMANY, RUSSIA) AND CUSTOMERTYPE ANY (DIRECT, VAR)

Fig.3I.  378 ACCESS SCOPE OF AN ACCESSOR DENYING ACCESS
378A SALESLOCATION ALL (UNITED STATES, RUSSIA) AND CUSTOMERTYPE ANY (VAR)

Fig.3J.  380 ACCESS SCOPE OF AN ACCESSOR ALLOWING ACCESS
380A SALESLOCATION ALL (GERMANY, RUSSIA) AND CUSTOMERTYPE ANY (VAR)

Fig.3K.  382 ACCESS SCOPE OF AN ACCESSOR ALLOWING ACCESS
382A SALESLOCATION ALL (UNITED STATES, CHINA, RUSSIA) AND CUSTOMERTYPE ANY (DIRECT)

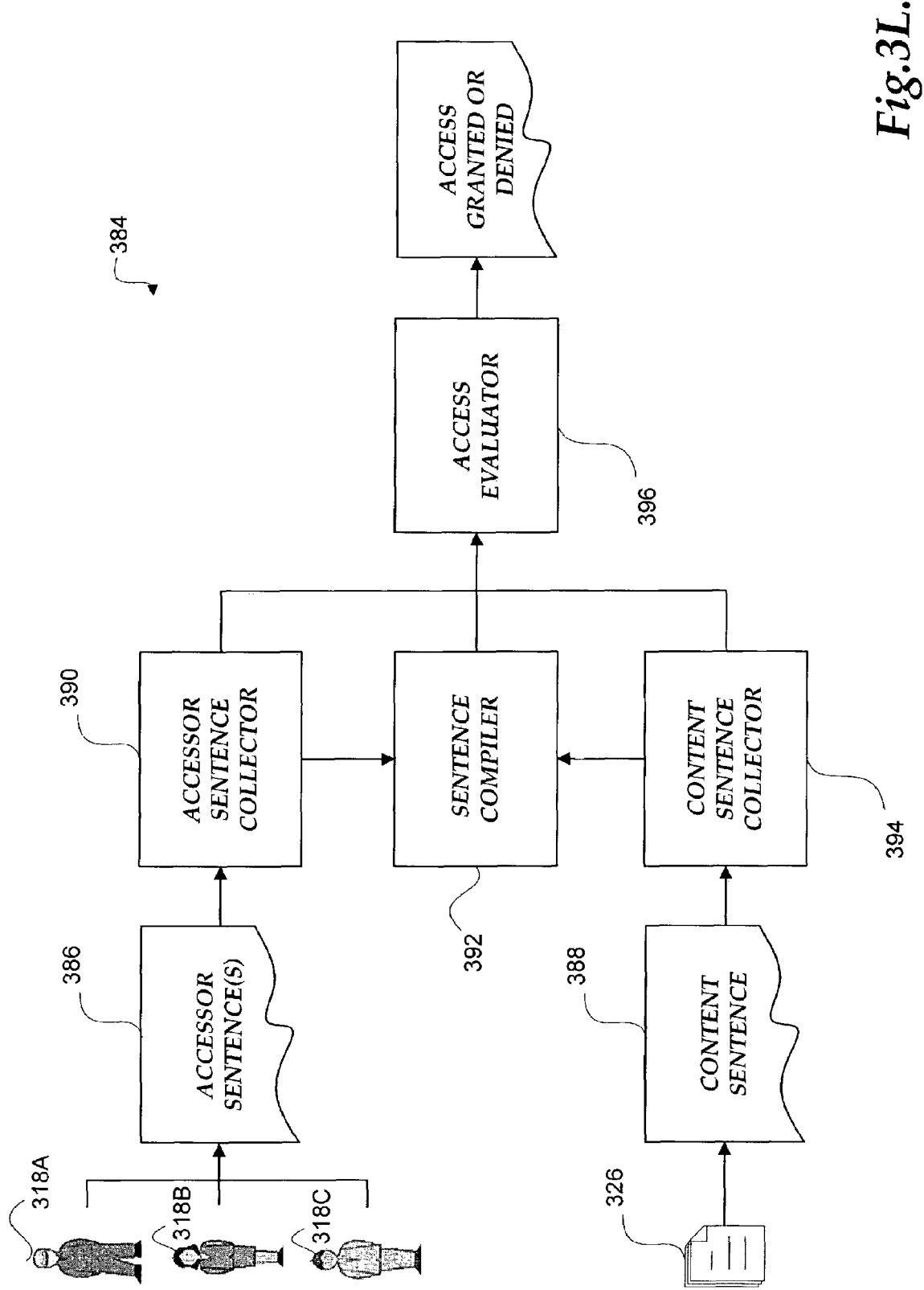

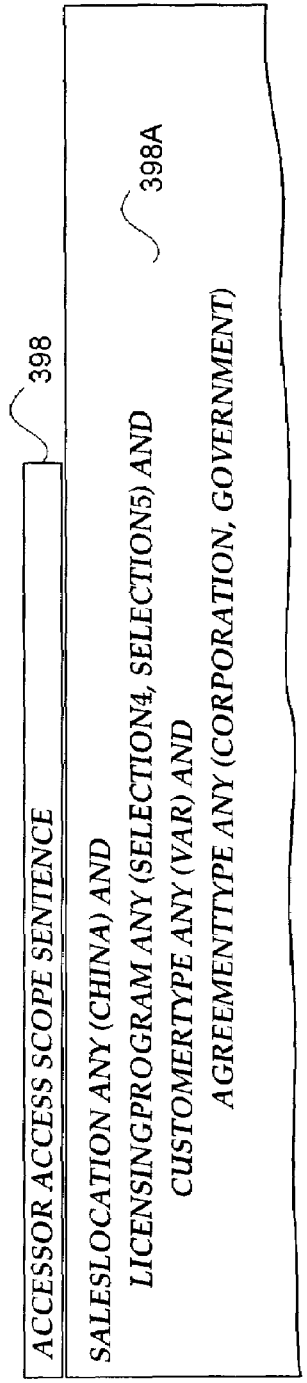

Fig.3M.

ACCESSOR ACCESS SCOPE SENTENCE

SALESLOCATION ANY (CHINA) AND
LICENSINGPROGRAM ANY (SELECTION4, SELECTION5) AND
CUSTOMERTYPE ANY (VAR) AND
AGREEMENTTYPE ANY (CORPORATION, GOVERNMENT)

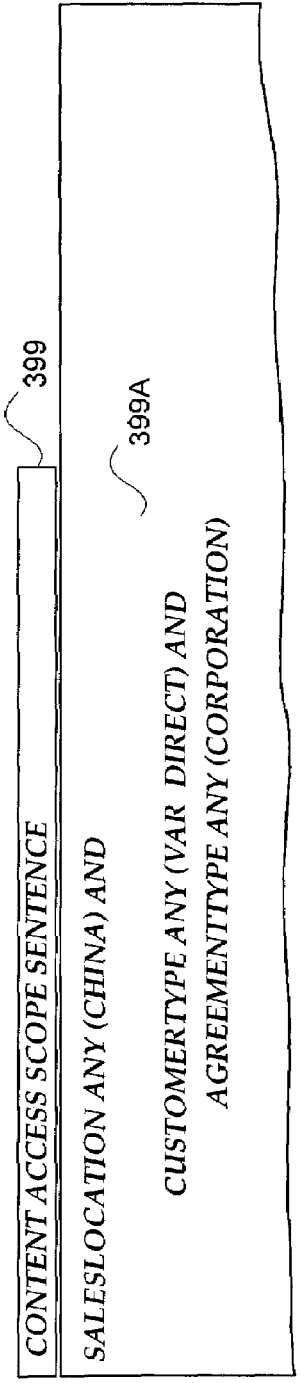

Fig.3N.

CONTENT ACCESS SCOPE SENTENCE

SALESLOCATION ANY (CHINA) AND
CUSTOMERTYPE ANY (VAR, DIRECT) AND
AGREEMENTTYPE ANY (CORPORATION)

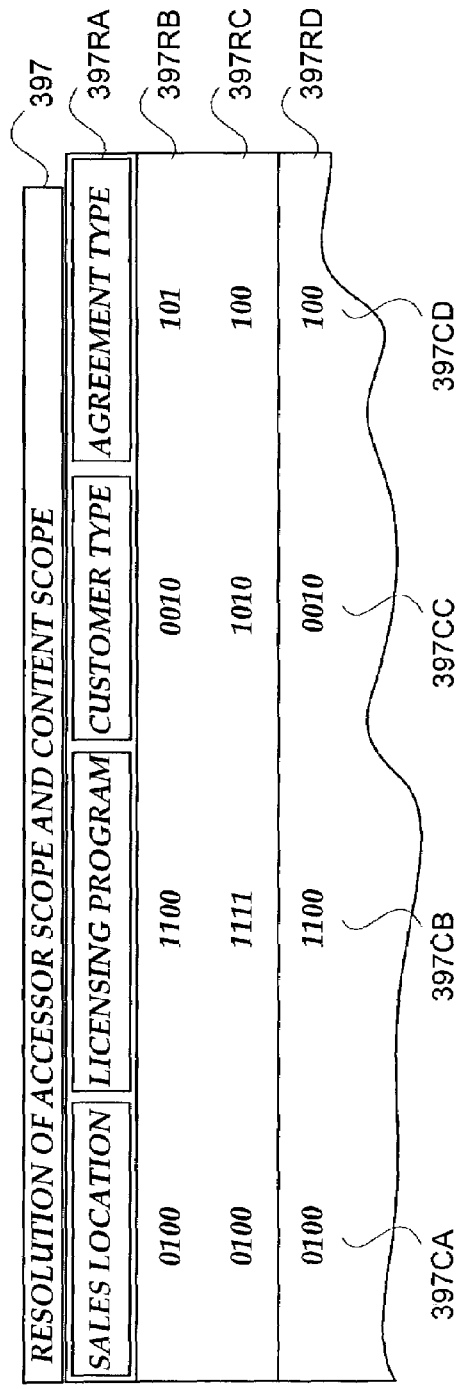

Fig.3O.

RESOLUTION OF ACCESSOR SCOPE AND CONTENT SCOPE

| SALES LOCATION | LICENSING PROGRAM | CUSTOMER TYPE | AGREEMENT TYPE |
|---|---|---|---|
| 0100 | 1100 | 0010 | 101 |
| 0100 | 1111 | 1010 | 100 |
| 0100 | 1100 | 0010 | 100 |

395 — CONTENT ACCESS SCOPE SENTENCE

395A — SALESLOCATION ANY (CHINA) AND CUSTOMERTYPE ANY (VAR, DIRECT) AND AGREEMENTTYPE ANY (ACADEMIC)

393 — RESOLUTION OF ACCESSOR SCOPE AND CONTENT SCOPE

| SALES LOCATION | LICENSING PROGRAM | CUSTOMER TYPE | AGREEMENT TYPE |
|---|---|---|---|
| 0100 | 1100 | 0010 | |
| 0100 | 1111 | 1010 | 101 |
| 0100 | 1100 | 0010 | 010 |
| | | | 000 |

393RA, 393RB, 393RC, 393RD

393CA, 393CB, 393CC, 393CD

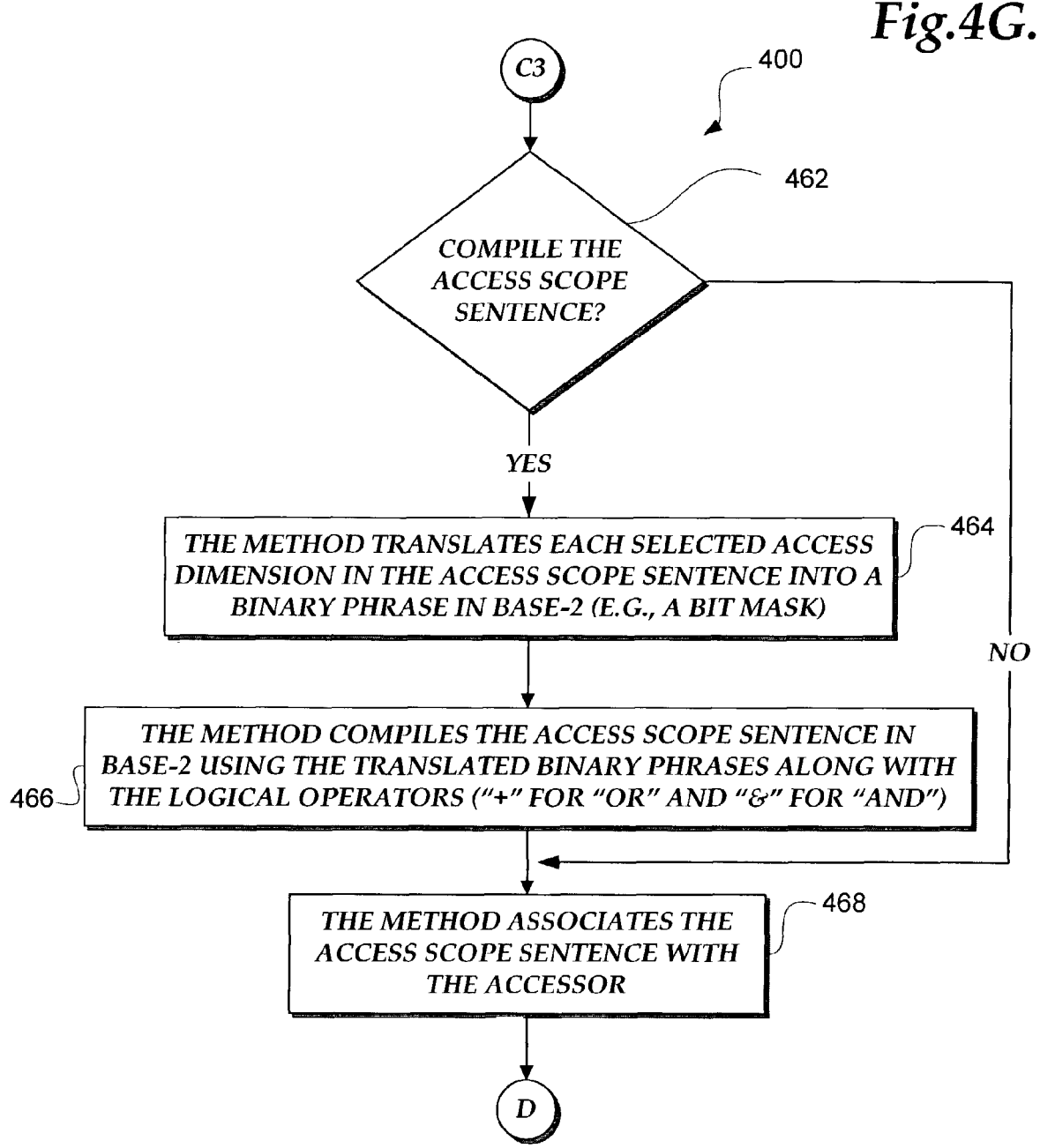

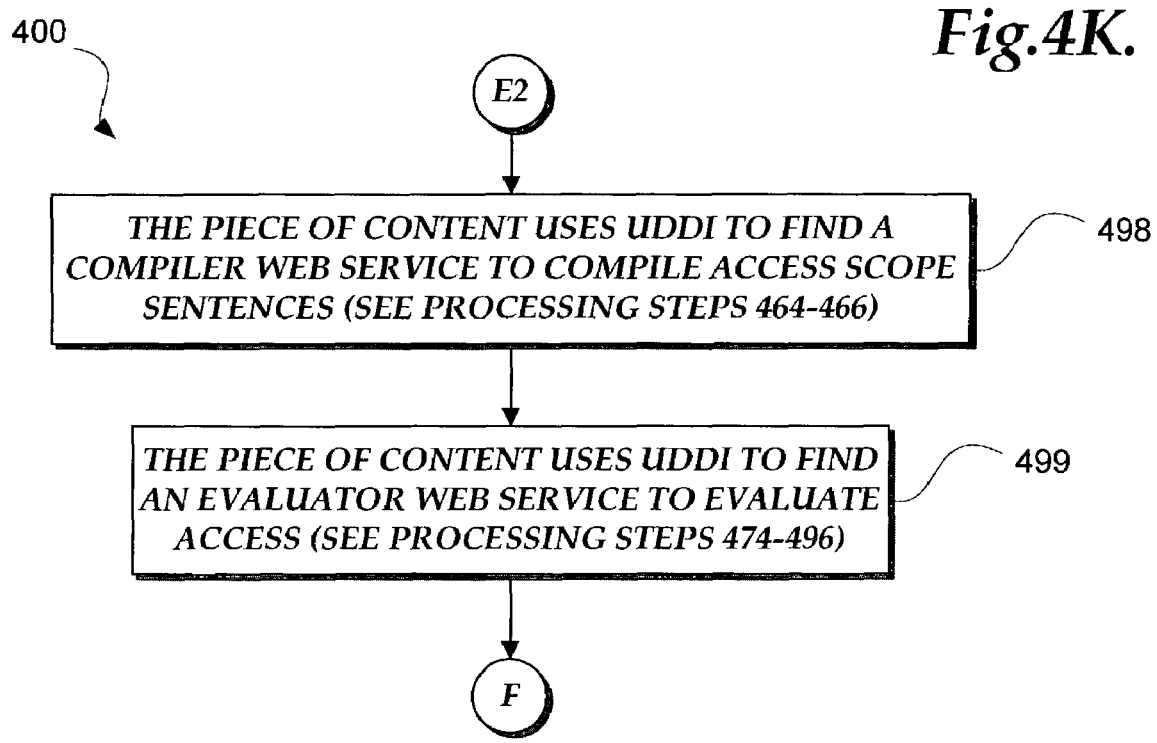

DISTRIBUTED EXPRESSION-BASED ACCESS CONTROL

FIELD OF THE INVENTION

The present invention relates generally to computer security, and more particularly, to the prevention of access to content stored on a computer by unauthorized individuals.

BACKGROUND OF THE INVENTION

Lack of security exposes computer systems to accidental mischief or intentional harm. Accidental mischief may innocently come from a child who somehow gains access to his parents' personal computer to cause physical loss of data, among other examples. Intentional harm is typically instigated by a "cracker," which is a dysphemism for a person who uses computer expertise for illicit ends, such as by gaining access to computer systems without permission and tampering with programs and data. It is easy to eliminate most computer security problems—just unplug computer systems from all external communications. But this is no longer the way of doing business (if it has ever been) for many companies, especially with the quickening pace of pushing commerce to the Internet. Thus, a major focus of computer security, especially on systems that are accessed by many people through communication lines, is the prevention of system access by unauthorized individuals.

A simple security model includes three elements: a user (who must be recognized by a computer system as an authorized user of the computer system); a piece of content that is desired by the user to view or alter, among other things, and a permission to access the piece of content by the user. This model is simple in theory but complicated for a system administrator to put into practice. Consider a situation in which a million users all want access to the piece of content. The model described above would force a system administrator to create and store a million different permissions, each corresponding with the million users, to limit access to the piece of content. Thus, more computing resources must be used—not to store content, but to process and store permissions. Not only is this economically unfeasible but the "permission explosion" itself may cripple the computer system without any undertaking by crackers.

To avoid administrative problems associated with permission explosion, an industry standard security model called role-based access control (RBAC) was developed. In role-based access control, a system administrator programmatically assigns roles to different types of users within an organization, such as a hospital's various staffs, and permissions to secured pieces of content are granted to those assigned roles. Because there are fewer roles than there are users (multiple users may have the same role, such as a nurse role), permission explosion is avoided. A user receives permission through the role he is assigned. A user can have multiple roles, hence indirectly gaining multiple permissions to access content in a computer system. A role can inherit the characteristics of other roles so that a user with an inheriting role also gets all the permissions granted to the inherited role. Although the role-based access control model eliminates administrative problems associated with permission explosion, it creates new administrative problems, namely those associated with "role explosion."

Consider the following explicit role inheritances: the Irish are Europeans (an Irish role inherits from a European role), and ophthalmologists are surgeons (an ophthalmologist role inherits from a surgeon role) who are doctors (a surgeon role inherits from a doctor role). If the system administrator needs to add just one complex role: "Dr. Murphy is an Irish ophthalmologist," this would require the system administrator to create from such a complex role many implied roles: Irish, European, ophthalmologist, surgeon, doctor, Irish ophthalmologist, Irish surgeon, Irish doctor, European ophthalmologist, European surgeon, and European doctor.

Only 11 implied roles are created from the example above, but there are situations that require the system administrator to create and painfully maintain thousands of roles so as to allow users to access pieces of content that are available only for an esoteric role. In practice, the system administrator compromises the security requirements of a company to prevent prohibitive administration costs and errors in the maintenance of roles. Another problem comes whenever a new piece of content is added to the computer system with its unique security requirements. The system administrator not only has to create a new role to represent the unique security requirements of the new piece of content, but he also needs to create a relationship between the new piece of content and the new role as well as create multiple relationships (possibly thousands) with existing roles. In practice, the system administrator avoids unearthing existing roles to understand how the new role fits the existing roles, and instead, likely add the new role in an ad hoc manner without considering the wider security implications of accommodating the new piece of content which allows him to move on with his business.

A system 100 in FIG. 1 illustrates the above-described problem as well as other problems in greater detail. The system 100 is a portion of a management information system at an organization, such as a hospital 120. The system 100, whose security depends on a role-based access model, is designed for processing and organizing information so as to provide various levels of management of the hospital 120, with accurate and timely information needed for supervising activities, tracking progress, making decisions, and isolating and solving problems.

The system 100 includes a user 102, who is Dr. Murphy, the surgeon; a user 104, who is a nurse; and a user 106, who is a CT scan technician. Users 102-106 are all employees of the hospital 120. Employees can gain entry to the hospital 120 via electronic card access (not shown). Using the role-based access control model, users 102-106 can inherit the role of employee (role 108). Role 108 has privileges, which include hospital entrance permission (permission 114). Because users 102-106 have the role of employee (role 108), users 102-106 can gain entry to the hospital 120 by waving their electronic cards near an electronic detector so as to allow the system 100 to verify their roles, hence granting them permission to enter.

Suppose that the hospital 120 procures eye laser equipment 122. Only authorized users, which is associated with permission 116, with the appropriate training may access and use the eye laser equipment 122 (which has a computer system to which a user must log on to operate the eye laser equipment 122). One such user is the user 102 (Dr. Murphy, the surgeon). However, the role-based access model prohibits permitting of a specific user to have access to a specific piece of content (so as to avoid permission explosion). Instead of trying to understand existing roles in the system 100, a system administrator of the hospital 120 fabricates a new role of "Dr. Murphy, the surgeon" (role 110) so as to allow only the user 102 (Dr. Murphy, the surgeon) to use the eye laser equipment. The problem, however, is that role 110 is not a role at all. If there were a thousand doctors, each doctor would require his own role, thereby creating permission explosion again.

Now suppose the hospital 120 were to procure new CT scan equipment 124. The CT scan equipment 124 has a computer to which a user must log on in order to operate the CT scan equipment 124. Only authorized users of the hospital 120 are allowed to access and use the CT scan equipment 124. Instead of trying to understand the existing roles at the hospital 120, the system administrator creates the role of a CT scan machine (role 112), which is associated with permission 118, allowing access to user 104, the nurse, and 106, the CT scan technician. The fabricated role of the CT scan machine (role 112), however, makes no sense at all within the role-based access control model because it does not identify a group of users within an organization, but instead, identifies a machine for the convenience of the system administrator. This non-representative role 102 attenuates the security strength of the system 100 over time because system administrators have increasingly difficult time understanding various role relationships which causes difficulty in managing authorized users and eliminating unauthorized access.

The problems described above are made more severe with the desire of many companies to expose corporate content to business partners and customers over the Internet. For example, the hospital 120 may allow a patient to view his hospital bills on-line from his home. Given the problems encountered maintaining content security within an organization with a relative few number of users, it will come as no surprise that exposing corporate computing assets to the world causes role explosion to an exponential degree, consuming time, introducing error, and sapping performance while rendering information to users both internally and externally. Without a resolution to the problem of role explosion, users may eventually no longer trust the system 100 to provide a secured computing experience that can allow quick access to content by authorized users while preventing access to content by unauthorized individuals. Thus, there is a need for a system, method, and computer-readable medium for securing information while avoiding or reducing the above problems associated with existing systems.

SUMMARY OF THE INVENTION

In accordance with this invention, a system, method, and computer-readable medium for evaluating access requests of users is provided. A system form of the invention includes a networked system for accessing a piece of content. The networked system comprises a user Web service for representing a user having an expressed user access scope; and a content Web service for representing a piece of content having an expressed content access scope, the user Web service communicating with the content Web service to access the piece of content when the expressed user access scope overlaps with the expressed content access scope.

In accordance with further aspects of this invention, a method form of the invention includes a computer-implemented method for evaluating the scope of a content access request by a user. The method comprises requesting a discovery framework by a user Web service to access a piece of content represented by a content Web service; notifying the content Web service by the discovery framework of the access request by the user Web service; and requesting the discovery framework by the content Web service for an access evaluator Web service to evaluate whether an access scope of the user Web service overlaps with an access scope of the content Web service to grant access to the piece of content.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3C is a block diagram-illustrating pieces of a system for accessing a piece of content by users, according to one embodiment of the present invention.

FIG. 3H is a textual diagram illustrating access scope sentences of a piece of content, according to one embodiment of the present invention.

FIG. 3I is a textual diagram illustrating an access scope sentence of an accessor, according to one embodiment of the present invention.

FIG. 3J is a textual diagram illustrating an access scope sentence of an accessor, according to one embodiment of the present invention.

FIG. 3K is a textual diagram illustrating an access scope sentence of an accessor, according to one embodiment of the present invention.

FIG. 3L is a block diagram illustrating a system for compiling access scope sentences and evaluating the compiled access scope sentences to grant or deny access to a piece of content, according to one embodiment of the present invention.

FIG. 3M is a textual diagram illustrating an accessor access scope sentence, according to one embodiment of the present invention.

FIG. 3N is a textual diagram illustrating a content access scope sentence, according to one embodiment of the present invention.

FIG. 3O is a structured diagram illustrating compiled access scope sentences and access resolution, according to one embodiment of the present invention.

FIGS. 4A-4K are process diagrams illustrating a method for evaluating the scope of content access requests by users, according to one embodiment of the present invention.

DETAILED DESCRIPTION OF THE PREFERRED EMBODIMENT

Figure 1:
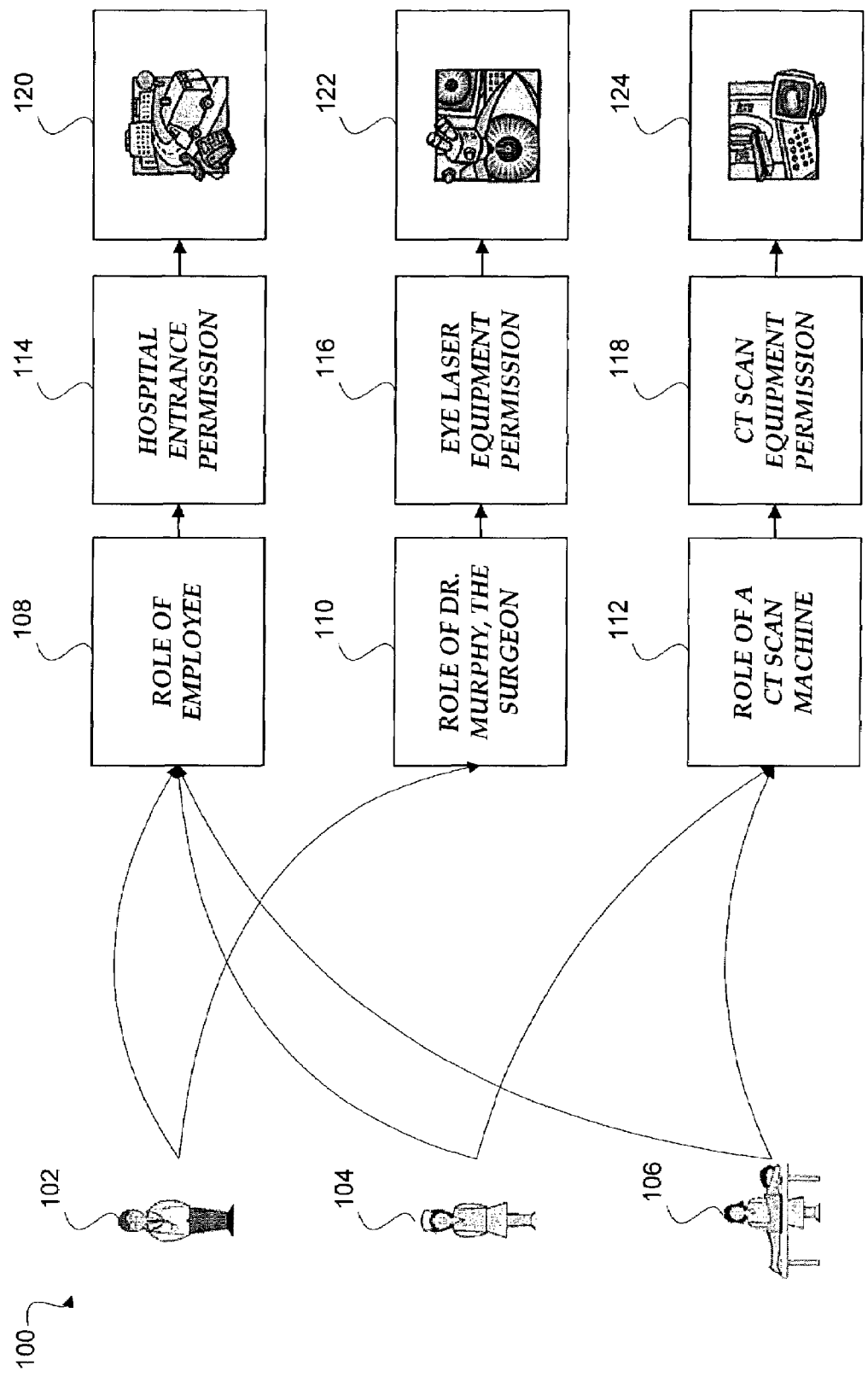
FIG. 1 is a block diagram illustrating a conventional system showing problems of role explosion in securing computer systems from access by unauthorized individuals.
Figure 2:
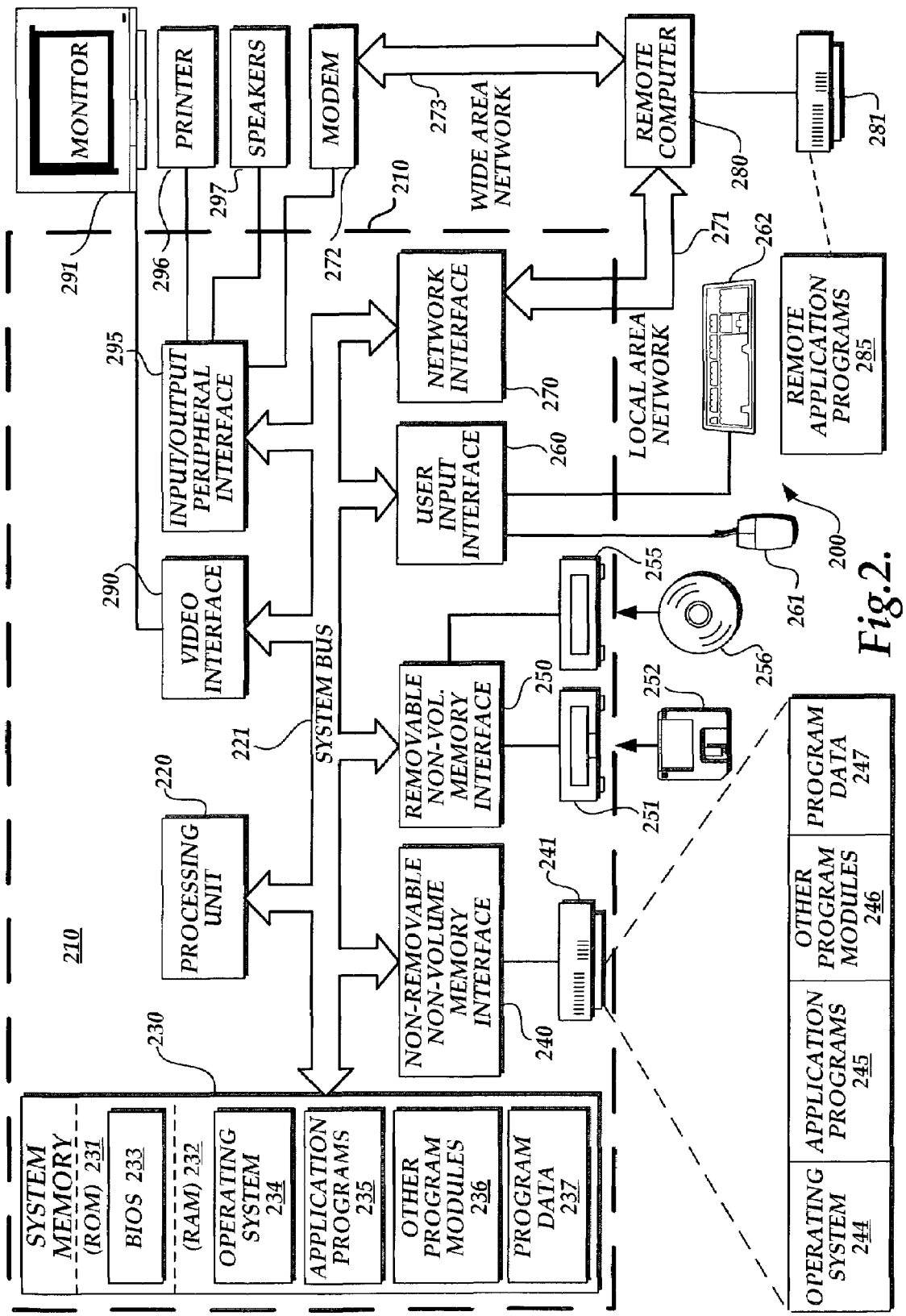
FIG. 2 is a block diagram illustrating an exemplary computing device.

FIG. 2 illustrates an example of a computing system environment 200 suitable for practicing certain aspects of the invention, such as evaluating the scope of content access requests by users so as to secure a computer system and its content from harm. The computing system environment 200 is only one example of a suitable computing environment and is not intended to suggest any limitation as to the scope of use or functionality of the invention. Neither should the computing environment 200 be interpreted as having any dependency or requirement relating to any one or combination of the illustrated and described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions such as program modules being executed by a computer. Generally, program modules include routines, programs, objects, components, data structures, etc. that perform particular tasks or implement particular abstract data types. The invention may also be practiced in distributed computing environments where tasks are performed by, remote processing devices that are linked through a communications network. In a distributed computing environment, program modules may be located in both local and remote computer storage media, including memory storage devices.

The computing system environment illustrated in FIG. 2 includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 210 typically includes a variety of computer-readable media. Computer-readable media can be any available media that can be accessed by computer 210 and includes both volatile and nonvolatile media, removable and non-removable media. By way of example, and not limitation, computer-readable media may comprise computer storage media and communication media. Computer storage media includes both volatile and nonvolatile, removable and non-removable media, implemented in any method or technology for storage of information, such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage; magnetic cassettes, magnetic tapes, magnetic disk storage ore other magnetic storage devices, or any other computer storage media. Communication media typically embody computer-readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF infrared, and other wireless media. A combination of any of the above should also be included within the scope of computer-readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are, immediately accessible and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates the hard disk drive 241 that reads from or writes to non-removable, nonvolatile magnetic media, the magnetic disk drive 251 that reads from or writes to a removable, nonvolatile magnetic disk 252, and an optical disk drive 255 that reads from or writes to a removable, nonvolatile optical disk 256, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 241 is typically connected to the system bus 221 through a non-removable memory interface, such as interface 240, and the magnetic disk drive 251 and optical disk drive 255 are typically connected to the system bus 221 by a removable memory interface, such as interface 250.

The drives and their associated computer storage media discussed above and illustrated in FIG. 2 provide storage of computer-readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices, such as a keyboard 262 and pointing device 261, the latter of which is commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port, or universal serial bus (USB). A monitor 291 or other type of display device is also connected to the system bus 221 via an interface, such as a video interface 290. In addition to the monitor, computers may also include other peripheral output devices, such as speakers 297 and printer 296, which may be connected through an input/output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such network environments are commonplace in offices, enterprise-wide computer networks, intranets, and the Internet.

When used in a LAN networking environment, the computer 210 is, connected to the LAN 271 through a network interface or, adapter 270. When used in; a WAN networking environment, the computer 210 typically includes a modem 272 or other means for establishing communications over the WAN 273, such as the Internet. The modem 272, which may be internal or external, may be connected to the system bus 221 via the input/output peripheral interface 295, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are for illustrative purposes only and other means of establishing a communication link between the computers may be used.

Various embodiments of the present invention avoid role explosion by abstracting users and roles associated with users into accessors. Permissions to a piece of content are granted to accessors. Thus, if a user or a role has an accessor that is permitted to access the piece of content, the user or the role may access the piece of content. The discovery of roles eliminates permission explosion because there are fewer roles than users. The discovery of accessors eliminates role explosion because there are fewer accessors than roles. Moreover, role explosion is controlled because permission to the piece of content is explicit revealed through expressions rather than implicitly hidden in roles, which can be imprecise. A user conveys his access scope through expressions independently from the access scope of the piece of content, which is also conveyed through expressions. These two expressions can be evaluated to determine whether the access scope of the user overlaps with the access scope of the piece of content. If so, the user may access the piece of content. If not, access will be denied. The term "overlap" means that a user needs an expression that covers the complete access scope required by the piece of content. A user expression can be larger in terms of access scope than the access scope defined by the expression of the piece of content but never smaller.

Figure 3A:
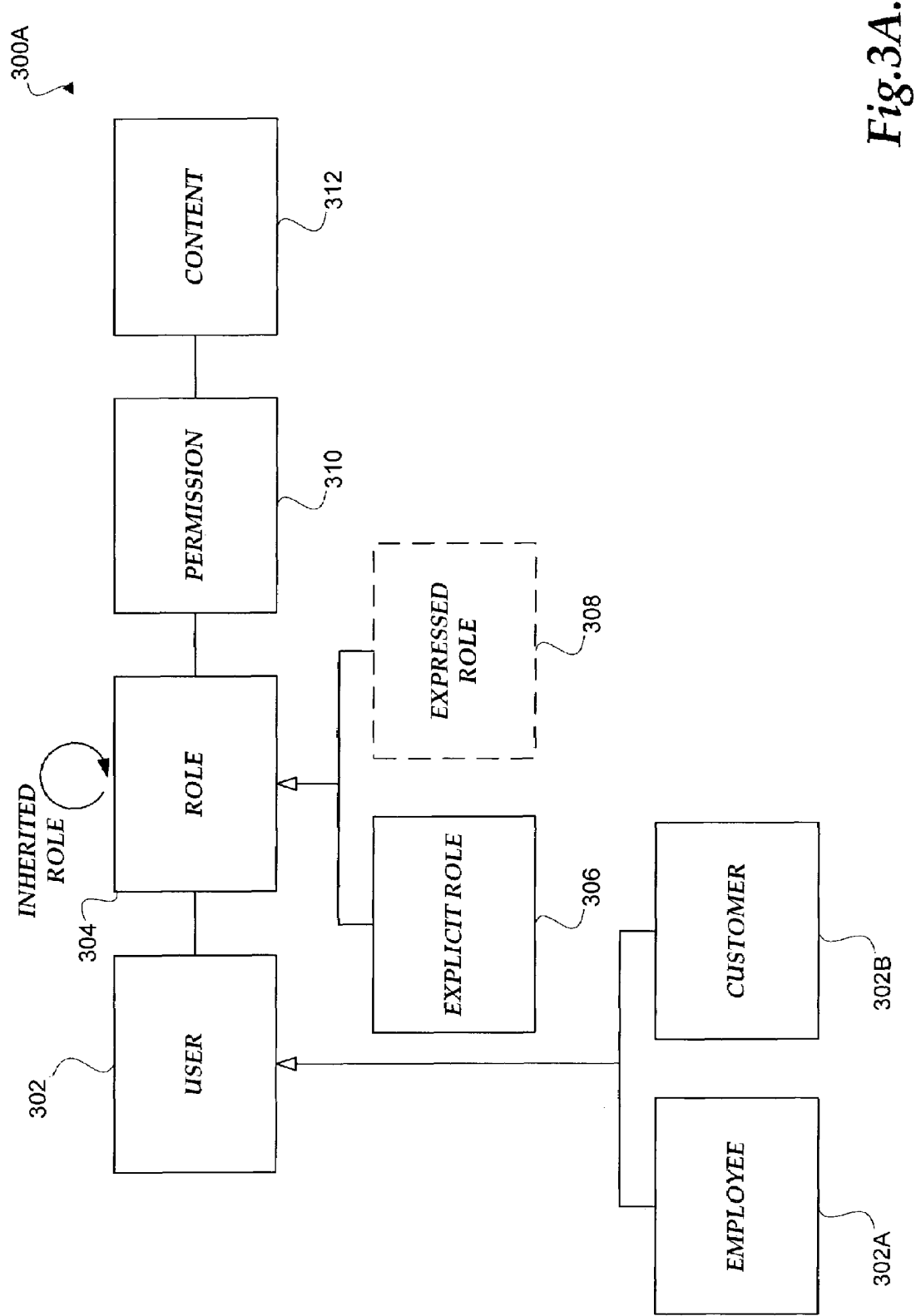
FIG. 3A is a class diagram illustrating generalized categories relating to roles and expressed roles, according to one embodiment of the present invention.

A class diagram 300A illustrates the use of expressions to make explicit the implicit access scope of a role. See FIG. 3A. A class, an object-oriented program, is a generalized category that describes a group of more specific items, called objects. Each class is a named description used in a program to define a set of attributes or a set of services (actions available to other parts of the program) that characterize any member (object) of a class. Classes are comparable in concept to categories that people use to organize information about their world that define the types of entities they include and the ways those entities behave.

In this particular instance, the class diagram 300A includes a user class 302, which represents an individual or a group of individuals in an organization, such as a company, that may have access to a piece of content in a computer system. The user class 302 defines or inherits a set of attributes or a set of services that may allow access to the piece of content in the computer system. Further specialized classes can be derived from the user class 302 to represent other entities that have a relationship to the organization. For example, an employee class 302A represents employees of the organization. The employee class 302A inherits from the user class 302 the characteristics of the user class 302 so as to gain the capability of accessing the piece of content. Similarly, customers of the organization can be represented by a customer class 302B, which inherits from the user class 302, thereby incorporating characteristics that also allow customers of the company to access the piece of content.

The user class 302 is associated with a role class 304. The role class 304 represents collections of privileges that are granted to users, which are represented by the user class 302. For example, a sales executive role may contain privileges allowing him to access a license to a piece of software residing on a computer system of a software manufacturer. An arrow extended in a circle illustrated above the role class 304 represents one or more inherited roles. An inherited role acquires the characteristics of the role class 304, such as privileges that are granted to the user class 302, albeit the inherited characteristics may be enhanced, restricted, or modified.

An explicit role 306 inherits the characteristics of the role class 304. The main attribute of the explicit role 306 is simply a name whose data structure is composed of a sequence of characters usually representing human-readable text. As previously discussed, explicit roles are difficult to maintain because their number may explode to an unmanageable size. An expressed role class 308 also inherits from the role class 304. The expressed role class 308 has at least two attributes: an expression type, which is preferably a set (a collection of distinct mathematical elements), and an expression, which textually describes the scope of access for a role. Various embodiments of the present invention use the expressed role class 308 to explicitly define an access scope that may encompass dozens to thousands of implied and explicit roles of a role-based access control model. The role class 304 is associated with a permission class 310. The permission class 310 is associated with a content class 312. The permission class 310 represents the ability of a particular role represented by the role class 304 to access a particular resource, such as a piece of content represented by the content class 312.

Figure 3B:
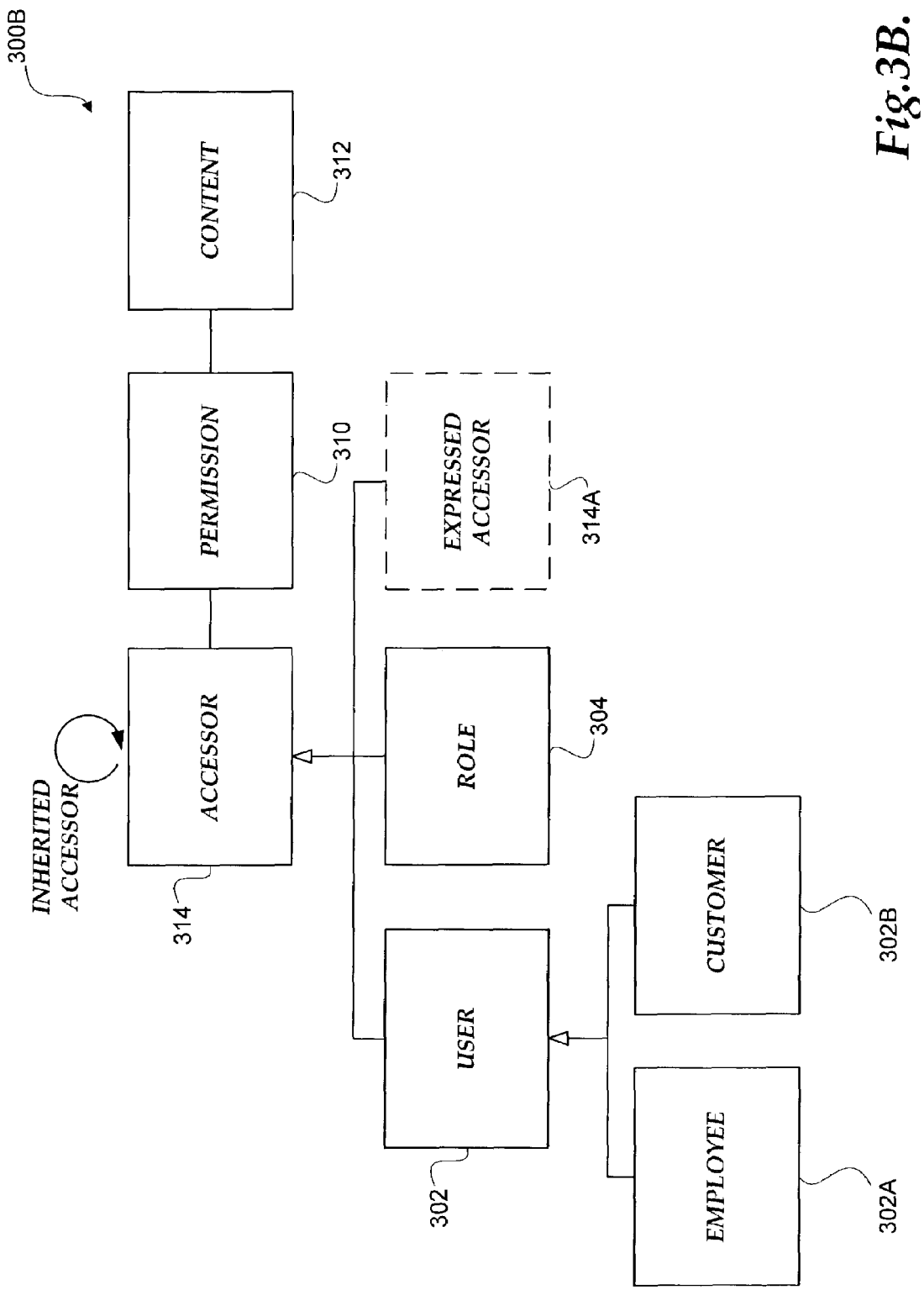
FIG. 3B is a class diagram illustrating generalized categories relating to expressed accessors, according to one embodiment of the present invention.

Another class diagram 300B is illustrated in FIG. 3B. The class diagram 300B contains many similar classes as described in the class diagram 300A but they will not be described here again for brevity purposes. An accessor class 314 represents the coupling of a permission (represented by the permission class 310) to the access of a piece of content (represented by the content class 312). Inherited accessors, represented by an arrow extending in a circle, have all the characteristics of the accessor class 314. Thus, inherited accessors have the same access privileges to the piece of content as the accessor class 314.

The user class 302, the role class 304, and an expressed accessor class 314A inherit from the accessor class 314. This abstraction allows an organization to structure its users (via the user class 302) and roles within the organization (via the role 304) without role explosion. In other words, both users and roles may grow, but there are only a few accessors from which users and roles inherit access privileges. Through the accessor class 314 permission is granted to access a piece of content. This allows a user to be assigned permissions directly to access a piece of content. The expressed accessor 314A has at least two attributes. One attribute is an expression type, which, is preferably a set (a collection of distinct mathematical elements). The other attribute is an expression characterized by a data structure composed of a sequence of characters usually representing human-readable text. The expression attribute allows the access scope of accessors as well as a piece of content to be explicitly revealed, hence easing the determination of whether a user should have access to the piece of content.

Users 318A-318C gain access to a piece of content 326 on a computer system 316 via a network (not shown). The network is a group of computers and associated devices that are connected by communications facilities. The network can involve permanent connections, such as coaxial or other cables, or temporary connections made through telephone or other communication links. The network can be as small as a LAN (local area network) consisting of a few computers, printers, and other devices, or it can consist of many small and large computers distributed over a vast geographic area (WAN or wide area network). One exemplary implementation of a WAN is the Internet, which is a worldwide connection of networks and gateways that use the TCP/IP suite of protocols to communicate with one another. At the heart of the Internet is a backbone of high-speed data communication lines between major nodes or host computers, including thousands of commercial, government, educational, and other computer systems, that route data and messages. One or more Internet nodes can go off line without endangering the Internet as a whole or causing communications on the Internet to stop, because no single computer or network controls it.

The computer system 316 uses a load balancing component 320, which is the first stage to receive access requests from users 318A-318C. The request can be formed from any suitable protocols. One suitable protocol includes SOAP (Simple Object Access Protocol), which is a simple, XML-based protocol for exchanging structured and type information on the Web. In distributed processing, the load balancing component 320 distributes activities across two or more servers in order to avoid overloading any one server with too many requests from users, such as users 318A-318C. Load balancing can be either static or dynamic. In the static case, the load is balanced ahead of time by assigning different groups of users to different servers. In the dynamic case, however, software refers incoming requests at run time to whichever server is most capable of handling them. The load balancing component 320 directs access requests of users 318A-318C to one of a number of Web servers 322A-322D, which are servers utilizing HTTP to deliver World Wide Web documents. The cluster of Web servers 322A-322D can be formed by utilizing a Web farm. Each Web, server 322A-322D unravels the protocol envelope of access requests from users 318A-318C.

Any suitable software can be run on servers 332A-332D, such as software providing ax framework for Web services.

The piece of content 326 is stored in a database 324. The database 324 is basically a file composed of records, each containing fields, together with a set of operations for searching, sorting, recombining, and performing other database functions. Each record of the database 324 has a data structure, which is typically characterized by rows and columns, with data occupying or potentially occupying each cell formed by a row-column intersection. The piece of content 326 therefore has a data structure for describing its information.

To limit access to the piece of content 326 only to authorized users, an access scope is expressed for each of users 318A-318C by the computer system 316. An access scope is also expressed for the piece of content 326. Access is possible when the access scope of a user overlaps with the access scope of the piece of content. If a user has an appropriate access scope, he has access privileges, which are permitted operations for a user to access a certain system resource on a network or file server. A variety of operations, such as the ability to access a server, view the contents of a directory, open a transfer file, and create, modify, or delete files or directories, can be allowed or disallowed by revealing the access scope through expressions in the system 316. These expressions conveying access scopes can be defined by a system administrator of the computer system 316 to limit access of users 318A-318C so as to maintain security on the computer system 316, as well as to maintain the privacy of confidential information, such as the piece of content 316, and to allocate system resources, such as disk space.

Figure 3D:
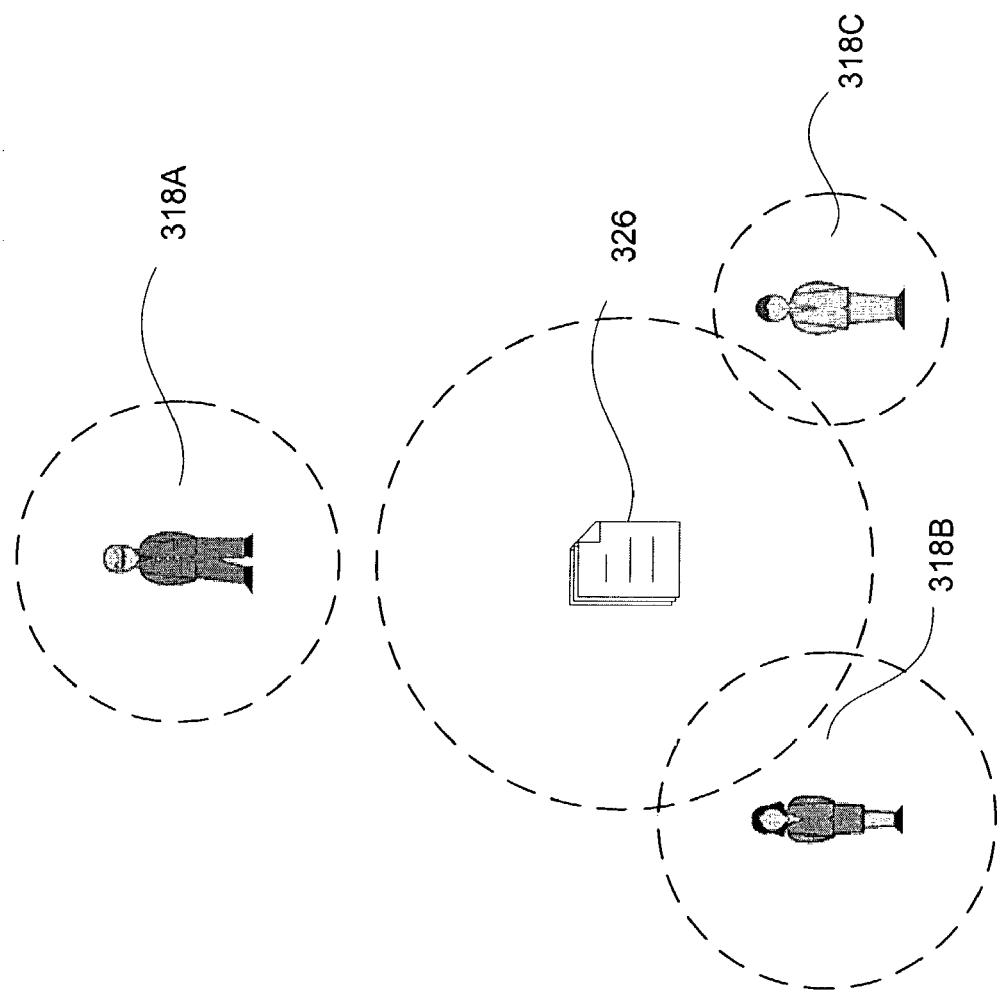
FIG. 3D is a pictorial diagram illustrating access scopes of users and access scope of a piece of content, according to one embodiment of the present invention.

An access scope of a user can be visualized as a sphere of privileges surrounding the user. These spheres of access scopes of users 318A-318C are two-dimensionally illustrated in FIG. 3D. Each user 318A-318C is enclosed in a circle bordered by dash lines. The area in each of the circles enclosing a user defines an access scope associated with the user. The access scope for the user 318B is larger than the access scope for the user 318A, which in turn is larger than the access scope for the user 318C. The piece of content 326 is also enclosed in a circle bordered with dash lines. The area inside the circle enclosing the piece of content 326 defines an access scope for the piece of content 326. The piece of content 326 symbolizes any resource in a computer system that needs to be safeguarded from unauthorized access. Access to the piece of content 326 is possible when the access scope of the piece of content 326 overlaps with the access scope of a user. The access scope of the user 318B overlaps with the access, scope of the piece of content 326, hence the user 318B may access the piece of content 326. The access scope of the user 318C also overlaps with the access scope of the piece of content 326, albeit the area of overlap is much less than that of the overlap between the access scopes of the user 318B and the piece of content 326. Nevertheless, because there is an overlap, the user 318C may also access the piece of content 326. The access scope of the user 318A lies outside the access scope of the piece of content 326. Because there is no overlap, therefore, the user 318A may not access the piece of content 326.

A user's access scope, unlike in a role-based access control model, can be expressed independently of the access scope of the piece of content 326. The determination of when a user has permission to access a piece of content is made at access time by determining whether there is an overlap between the access scope of a user and the access scope of a piece of content. This decoupling is possible in various embodiments of the present invention allowing the piece of content 326 to be granted to classes of users, such as users 318B-318C, without ever needing to form an explicit relationship tying users 318B-318C to the piece of content 326. Access scopes of users may be completely defined via expressions without needing to determine which pieces of content are accessible via certain access scopes, and, at the same time, access scopes of pieces of content may be completely defined via expressions without any reference to classes of users, such as users 318B-318C. This reduces the size of the permission space, hence reducing exponential role explosion and simplifying administration of the system 316.

Figures 3E, 3F:
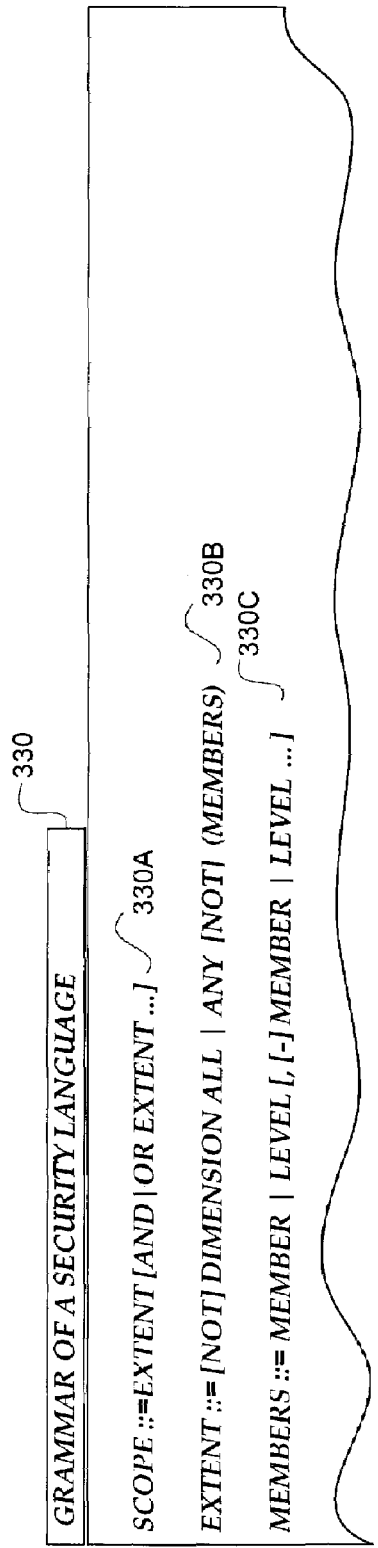
FIG. 3E is a textual diagram illustrating a grammar of a security language, according to one embodiment of the present invention.
FIG. 3F is a structured diagram illustrating a portion of a table defining a portion of a security space, according to one embodiment of the present invention.

Expressions conveyed by the access scope of users 318A-318C and the piece of content 326 are expressed by a security language 330 shown in FIG. 3E. A grammar of a security language 330 specifies the syntax of the security language 330, which is the way in which linguistic elements (such as words) are put together to form constituents of a phrase or a sentence to define an access scope of a user or a piece of content. Access scope expressions are formalized in sentences of the security language 330. Each sentence of the security language 330 carves out from a security space an access scope for a user or a piece of content.

Line 330A of the grammar of the security language 330 defines a syntactical rule to form an access scope sentence, which recites "SCOPE EXTENT ::= [AND | OR EXTENT . . . ]," where the term "SCOPE" represents an access scope of a user or a piece of content; the symbol "::=" represents the commencement of the definition of the term SCOPE; the term "EXTENT" represents the range of a security space over which an access scope extends; the bracket "[" and its companion bracket "]" indicate that the syntactical elements between the brackets are optional; the term "AND" is a logic operator to form a conjunction; the symbol "|" represents a choice to be made between elements that are adjacent to the vertical bar "|"; the term "OR" represents a logic operator to form a disjunction; and the symbol " . . . " represents that additional EXTENTs may be defined to complete the access scope sentence.

The syntactical element EXTENT is defined on, line 330B: "[NOT] DIMENSION ALL | ANY [NOT] (ELEMENTS)", where the bracket "[" and its companion bracket "]" indicate that the enclosed syntactical elements between the brackets are optional; the first term "NOT" represents a logical operator that causes an inverse to occur; the term "DIMENSION" represents a group of members that define a portion of a security space in which an access scope is defined; the term "ALL" represents a set operator that requires each member in a set to be processed; the symbol "|" represents a choice to be made between elements adjacent to the symbol "|"; the term "ANY" represents a set operation that requires any one of a number of members in a set to be processed; the bracket "[" and its companion bracket "]" indicate that the syntactical elements enclosed by the brackets are optional; the second term "NOT" represents a set operator that defines the not set; the parenthesis "(" and its companion parenthesis, ")" represents a set of members; and the term "MEMBERS" represents members of a set.

The syntactical element MEMBERS is defined on line 330C as follows: "MEMBER | LEVEL [,[-] MEMBER | LEVEL . . . ]", where the term "MEMBER" represents a member of a DIMENSION defining a portion of a security space; the symbol "|" represents a choice to be made between two elements adjacent to the symbol "|"; the term "LEVEL" represents a hierarchical label within a security space under which a number of dimensional members can be organized; the first set of brackets "[" and "]" indicate optional syntactical elements enclosed within the brackets; the symbol "," represents a delimitation of one constituency or member of the DIMENSION from another member; the second set of brackets "[" and "]" indicates optional syntactical elements to be included (which are defined between the brackets); the symbol "–" represents a subtraction of a MEMBER from a LEVEL so as to remove the subtracted MEMBER from processing; and the symbol " . . . " represents that additional MEMBERs or LEVELs may be defined to complete the list of member.

Before the security language 330 can be used to express access scopes of users 318A-318C and the piece of content 326, a security space is preferably defined. A security space is preferably defined by segregating access possibilities into a number of dimensions, each dimension having members specifying in greater detail the properties of the dimension. Suppose that the users 318A-318C are sales executives wanting to access a software license (the piece of content 326) stored in the computer system 316. A security space; such as a portion of a licensing security space 332 illustrated at FIG. 3F, is defined.

The portion of the licensing security space 332 is presented in a table in which information is contained at row-column intersections. The table form facilitates discussion but information of the portion of the licensing security space 332 need not be in table form and can be in other suitable forms. One such suitable form includes a hierarchical graph, such as a directed acyclic graph. Row 332RA contains four cells, which have category designations for each dimension defining the portion of the licensing security space 332. For example, cell 332RA, 332CA defines a "sales location" dimension; cell 332RA, 332CB defines a "licensing program" dimension; cell 332RA, 332CC defines a "customer type" dimension; and cell 332RA, 332CD defines an "agreement type" dimension. Cells in column 332CA (and rows 332RB-332RE) contain members of the "sales location" dimension, such as United States, China, Germany, and Russia; cells in column 332CB (and rows 332RB-332RE) define members of the "licensing program" dimension, such as selection 4, selection 5, open, and school. Cells in 332CC (and rows 332RB-332RE) define members of the "customer type" dimension, such as direct, OEM, VAR, and ISV; and cells in column 332CD (and rows 332RB-332RE) define members of the "agreement type" dimension, such as corporation, academic, and government. The portion of the licensing security space 332 can be used in conjunction with the security language 330 to define access scopes for users 318A-318C and the piece of content 326 to limit unauthorized access.

Figure 3G:
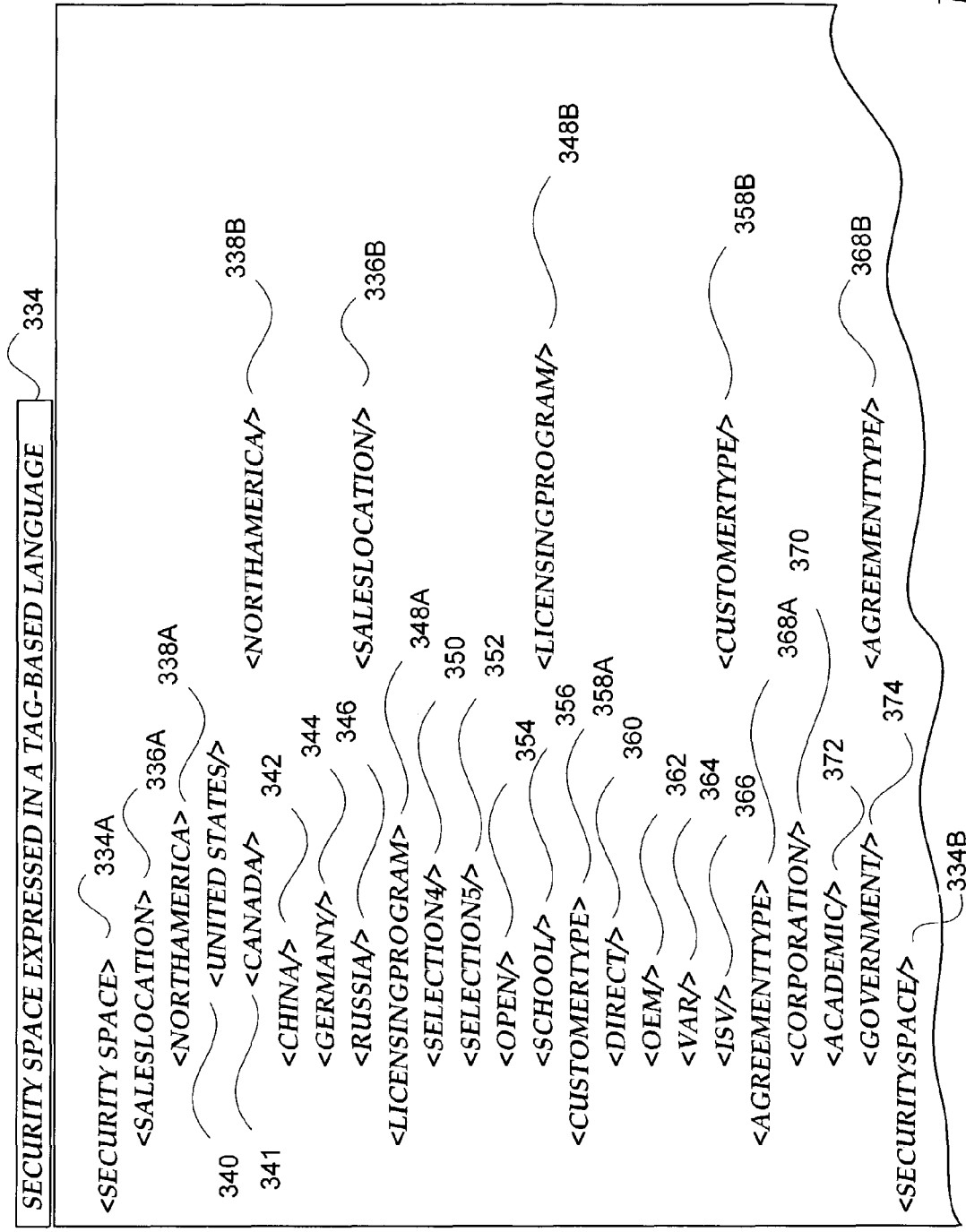
FIG. 3G is a structured, diagram illustrating a portion of a security space expressed in a customizable, tag-based language, according to one embodiment of the present invention.
Figure 3P:
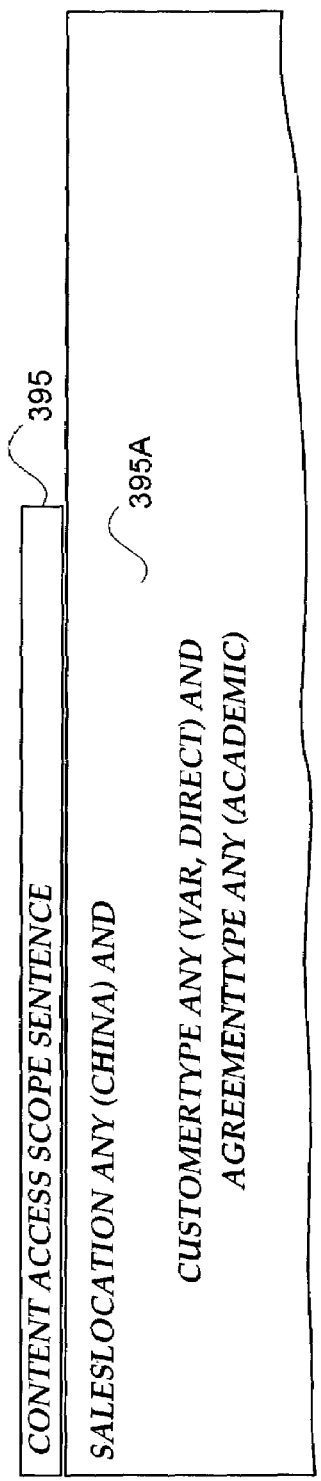
FIG. 3P is a textual diagram illustrating a content access scope sentence, according to one embodiment of the present invention.

As indicated above, the information in the portion of the licensing security space 332 need not be in table form but can be presented in a hierarchical form. One such form is created from a customizable, tag-based language, such as XML. See FIG. 3G. A portion of a security space 334 shown in FIG. 3G contains the portion of the licensing security space 332 illustrated in FIG. 3F. The portion of the licensing security space 332 is defined between a root tag <SECURITYSPACE> 334A and its companion tag <SECURITYSPACE/> 334B. A tag <SALESLOCATION> 336A and its companion tag <SALESLOCATION> 336B comprise the dimension "sales location" defining a portion of the licensing security space 334. Nesting between <SALESLOCATION> tags 336A, 336B is a tag <NORTHAMERICA> 338A: and its companion tag <NORTHAMERICA/> 338B, which represent a LEVEL syntactical element (FIG. 3E). Nesting further between <NORTHAMERICA> tags 338A, 338B is a tag <UNITEDSTATES> 340 and a tag <CANADA> 341 (each represents a MEMBER syntactical element (FIG. 3E)). Nesting between <SALESLOCATION> tags 336A, 336B are tags <CHINA/> 342; <GERMANY/> 344; and <RUSSIA/> 346 (each represents a MEMBER syntactical element). The portion of the licensing security space 334 defined between tags 334A, 334B further contains another dimension defined between a tag <LICENSINGPROGRAM> 348A and its companion tag <LICENSINGPROGRAM/> 348B. Nesting between <LICENSINGPROGRAM> tags 348A, 348B, are a number of tags that represent the members of the "LICENSINGPROGRAM" dimension: tag <SELECTION4/> 350; tag <SELECTION5> 352; <OPEN> 354; and tag <SCHOOL/> 356. The "customer type" dimension is defined between tag <CUSTOMERTYPE> 358A and its companion tag <CUSTOMERTYPE/> 358B. A number of members for the "customer type" dimension are defined between <CUSTOMERTYPE> tags 358A, 358B: tag <DIRECT/> 360; tag <OEM/> 362; tag <VAR/>, 364; and tag <ISV/> 366. The "agreement type" dimension is defined between tag <AGREEMENTTYPE> 368A and its companion tag <AGREEMENTTYPE/> 368B. Tags <CORPORATION/> 370, <ACADEMIC/> 372, and <GOVERNMENT> 374 define the members of the "agreement type" dimension.

Once the security space, such as the licensing security space 332, 334, has been defined with dimensions as well as members or levels of these dimensions, the security language 330 can be used to create sentences expressing the access scopes of users 318A-318C and the piece of content 326. FIG. 3H illustrates two sentences 376A, 376B expressing the access scope of the piece of content 326. The sentence 376A describes an access scope "SALESLOCATION ANY (UNITED STATES, CHINA) AND CUSTOMERTYPE ANY (DIRECT, OEM)". The sentence 376A means that the access scope of the piece of content 326 includes any sales locations that are in the United States or China, and the customer type can be either direct or OEM. The sentence 376B defines another access scope "SALESLOCATION ANY (GERMANY, RUSSIA) AND CUSTOMERTYPE ANY (DIRECT, VAR)". The access scope defined by the sentence 376B means that the sales location can be either in Germany or Russia, and the customer type can be either direct or VAR.

An access scope 380 is defined for the user 318A (illustrated at FIG. 3J) and will not allow the user 318A to gain access to the piece of content 326 whose access scope is expressed by sentences 376A, 376B. Line 380A expresses the access scope of the user 318A to include "SALESLOCATION ALL (UNITED STATES, RUSSIA) AND CUSTOMERTYPE ANY (VAR)". While the access scope for the piece of content 326 defined at sentences 376A, 376B does have a combination of United States and Russia, it lacks a permutation where a VAR customer type can be in combination with sales location in both United States and Russia. Consequently, no access will be allowed for the user 318A.

An access scope 378 for the user 318B is illustrated at FIG. 3I. Sentence 378A defines the access scope 378 as follows: "SALESLOCATION ALL (GERMANY, RUSSIA) AND CUSTOMERTYPE ANY (VAR)". The security scope defined at line 378A means that access of the user 318B is limited to sales locations that are both in Germany and Russia and the customer type is VAR. Access is permitted to the piece of content 326 by the user 318B because there is an overlap in the access scope. For example, the access scope expressed by the sentence 376B for the piece of content 326 overlaps with the access scope expressed by the sentence 380A because the sales location can be in both Germany and Russia and the customer type is VAR.

Under certain circumstances where multiple access scope sentences are defined for a user or a piece of content, such as lines 376A, 376B, and only one access scope sentence is defined for comparison, such as the access scope 382 illustrated in FIG. 3K, the resolution of access may be concluded erroneously. For example, sentence 382A expresses the access scope for the user 318C as "SALESLOCATION ALL (UNITED STATES, CHINA, RUSSIA) AND CUSTOMERTYPE ANY (DIRECT)". Neither the access scope sentence defined at sentences 376A, 376B would resolve allowing the user 318C to access the piece of content 326. The reason is that neither the sentence at the sentence 376A nor the sentence 376B has sales locations in all of United States, China and Russia. However, logically, the sentence 376A can be combined with the sentence 376B to form a sentence where a sales location can be either in the United States, China, or Russia, and the customer type is direct. With this permutation of sentences 376A, 376B, there is an overlap with the access scope as expressed, by the sentence 382A, and access is allowed to the piece of content 326.

A system 384 in which access scope sentences of the security language 330 are evaluated to determine whether to grant or to deny access to the piece of content 326 is described. See FIG. 3L. Users 318A-318C have access scopes expressed by accessor sentences 386 which are formed from expressions using the security language 330. The piece of content 326 has an access scope expressed by content sentences 388 and formed by using the security language 330. An accessor sentence collector 390 collects accessor sentences 386 from a user 318A-318C and determines whether the accessor sentences need to be compiled so as to enhance access evaluation performance. If the accessor expressions 386 need to be compiled, the accessor sentence collector 390 forwards the accessor expressions 386 to a sentence compiler 392 where the textual form of the accessor sentences will be translated into binary form. Content sentence 388 is collected by a content expression collector 394. The content expression collector 394 decides whether the content expression 388 needs to be compiled for subsequent access evaluation. If it is necessary to compile the content expression 388, the content expression collector 394 forwards the content expression 388 to the sentence compiler 392. If neither the accessor sentences 386 or the content sentence 388 need to be compiled for access evaluation, they will be forwarded to an access evaluator 396. The access evaluator 396 makes a binary comparison between the compiled accessor sentences 386 and the compiled content sentence 388 to determine if there is an overlap in the access scope. If there is an overlap in the access scope, the access evaluator 396 will grant a user 318A-318C access to the piece of content 326. Otherwise, the access evaluator 396 will deny access to a user 318A-318C.

FIG. 3M illustrates an accessor access scope 398 of a user, such as users 318B-318C, that can be submitted to the sentence compiler 392 for processing. A sentence 398A expresses the accessor access scope 398 as follows: "SALESLOCATION ANY (CHINA) AND LICENSINGPROGRAM ANY (SELECTION4, SELECTION5) AND CUSTOMERTYPE ANY (VAR) AND AGREEMENTTYPE ANY (CORPORATION, GOVERNMENT)". The compilation of the accessor expression 399 is shown in binary form at row 397RB of table 397 (FIG. 3O). FIG. 3N illustrates a content access scope 399 for a piece of content, such as the piece of content 326. A sentence 399A expresses the content access scope and can be compiled by the security compiler 392 to translate from textual form to binary form for evaluation purposes. The sentence 399A expresses the content access scope 399 as follows: "SALESLOCATION ANY (CHINA) AND CUSTOMERTYPE ANY (VAR, DIRECT) AND AGREEMENTTYPE ANY (CORPORATION)". The content expression 399 is compiled into a binary form at row 397RC of the table 397 (FIG. 3O).

The table 397 at FIG. 3O shows the compiled accessor sentence 398A (row 397RB) in parallel with the compiled content sentence 399A (row 397RC) which can be used by the access evaluator 396 to determine whether there is any overlap to grant access or deny access. The table 397 has four columns 397CA-397CD, each showing binary phrases (bit masks), each textually representing an extent of a dimension in the portion of the licensing security space 332, 334. Row 397RA of the table 397 defines the dimension categories of the portion of the security space 332, 334 (such as sales location, licensing program, customer type, agreement type). Row 397RB is the compiled accessor sentence 398A. Row 397RC is the compiled content sentence 399A. Row 397RD is the binary result from logically ANDing the binary sentence at row 397RB with the binary sentence at row 397RC.

Cell 397RB, 397CA contains the binary phrase "0100" which indicates that China is a selected member in the dimension "sales location." The "1" of the binary phrase "0100" simply indicates that "China" at column 332CA (FIG. 3F) is positioned below United States and above Germany and Russia. Similarly, cell 397RB, 397CB contains the binary phrase "1100", reflecting that "selection 4" and "selection 5" of the "licensing program" dimension are selected. (column 332CB, FIG. 3F). Cell 397RB, 397CC contains the binary phrase "0010" identifying that the member "VAR" of the "customer type" dimension was selected. (column 332CC, FIG. 3F). Cell 397RB, 397CD contains a binary phrase "101" reflecting that members "corporation" and "government", of the "agreement type" dimension was selected. (column 332CD, FIG. 3F).

Regarding the compiled content sentence 399A, cell 397RC, 397CA contains a binary phrase "0100" reflecting that the member "China" of the "sales location" dimension was selected. (column 332CA, FIG. 3F). Cell 397RC, 397CB contains a binary phrase "1111" reflecting that no member of the "licensing program" dimension was selected for the content expression 399. The reason why the binary phrase "1111" is used in this instance is because the "licensing program" dimension has not been chosen as a security dimension to evaluate access (because of its omission from the content sentence 399A). Cell 397RC, 397CC contains a binary phrase "1010" indicating that members "VAR" and "direct" of the "customer type" dimension were selected. Cell 397RC, 397CD contains a binary phrase "100" reflecting that the member "corporation" of the "agreement type" dimension was selected. (column 332CD, FIG. 3F).

To evaluate for overlapping of dimensions for granting or denying access, the access evaluator 396 logically ANDs the binary sentence at row 397RB and the binary sentence at row 397RC resulting in the binary sentence at row 397RD. Because the numerical value of each binary phrase of the binary sentence at row 397RD is greater than zero, there is at least one dimensional overlap, hence access is allowed for a user having the accessor sentence 398A.

As a point of contrast, a content accessor scope 395 is provided to show a case where the access evaluator 396 denies an access request by a user. A sentence 395A expresses the content access scope 395 as follows: "SALESLOCATION ANY (CHINA) AND CUSTOMERTYPE ANY (VAR, DIRECT) AND AGREEMENTTYPE ANY (ACADEMIC)". The content sentence 395A varies from the content sentence 399A (FIG. 3N) slightly by a change in the selection of the member "academic" for the "agreement type" dimension.

Figure 3Q:
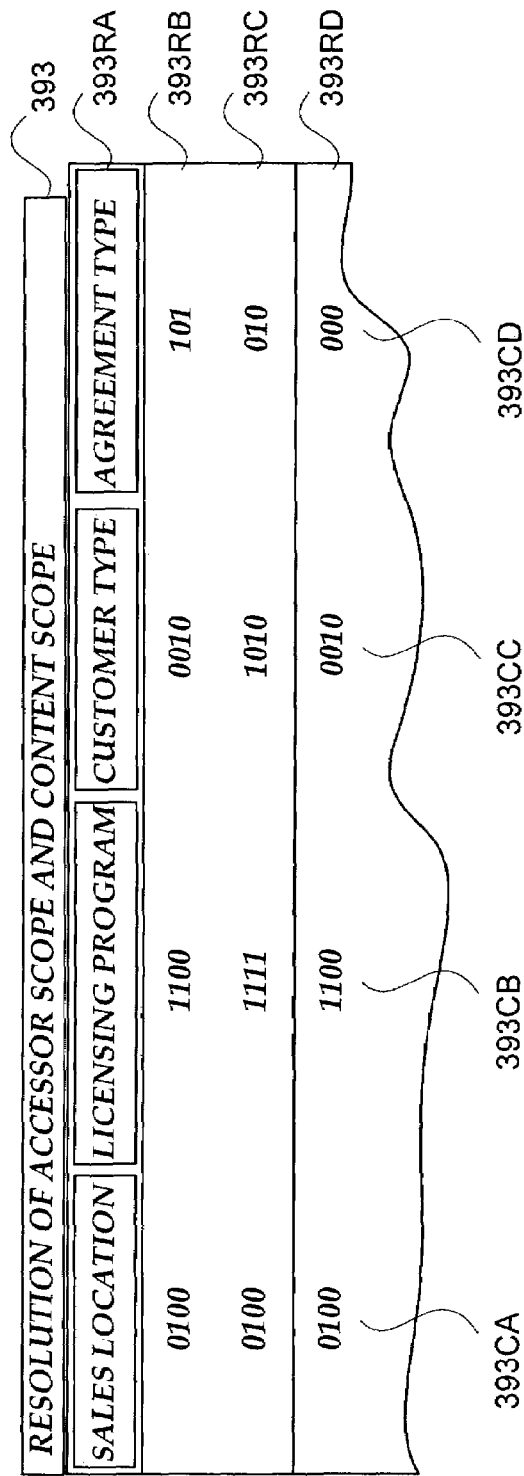
FIG. 3Q is a structured diagram illustrating compiled access scope sentences and access resolution, according to one embodiment of the present invention.

The compilation of the content expression 395 is shown at row 393RC of table 393. See FIG. 3Q. Many elements of the table 393 are similar to the table 397 (FIG. 3O), such as row 393RA and row 393RB, but their description will not be represented here for brevity purposes.

The resultant binary sentence shown at row 393RD is similar to the resultant binary sentence at row 397RD except that cell 393RD, 393CD contains a binary phrase "000". This resultant binary phrase "000", is formed from the logical ANDing of the binary phrase "101" (cell 393RB, 393CD) and the binary phrase "010" (cell 393RC, 393CD). Because not all of the binary phrases of the binary sentence at row 393RD have numerical values greater than 0, the access evaluator 396 determines that access to the piece of content 326 is denied.

Components of the system 384, such as the security compiler 392 and the security evaluator 396, are pieces of software running on the system 384. These pieces of software, including representations of users 318A and 318C and the piece of content 326, can be distributed on the Internet as Web services, which are a modular collection of Web protocol-based applications that can be mixed and matched to provide functionality through an Internet connection. Web services use standard Internet protocols such as HTTP, XML, and SOAP to provide connectivity and interoperability between Web services. For example, Web services 389A-389C can represent users 318A-318C in a framework of Web services. Web services 389A-389C can contain one or more accessor sentences to define the access scope of Web services 389A-389C.

Any suitable set of technologies can be used to build, host, deploy and use Web services 389A-389C. One suitable set of technologies includes the NET framework of Microsoft Corporation, but other suitable technologies can be used. The same set of technologies can be used to transform the security evaluator 396 into an access evaluator Web service 387. The same set of technologies can be used to transform the sentence compiler 392 into a sentence compiler Web service 383. The piece of content 326 and its corresponding content sentence 388 can be transformed into a Web service 381 using the Web service technologies. Web services 381, 383, 387, 389A-389C can register themselves with the Universal Description Discovery and Integration framework 385 (UDDI). UDDI is a platform-independent framework functioning like a directory that provides a way to locate and register Web services on the Internet.

Using the UDDI 385, users represented by Web services 389A-389C can discover the piece of content 326 encapsulated as the Web service 381 and request access to the piece of content 326. The Web service 381 uses the UDDI 385 to locate the sentence compiler Web service 383 to compile (as discussed above with respect to FIGS. 3M-3Q) accessor sentences and content sentences to obtain a resultant binary sentence. The Web service 381 can locate via the UDDI 385 the access evaluator Web service 387 to evaluate the resultant binary sentence to determine whether to grant or deny access to one or more, Web services 389A-389C representing one or more users 318A-318C. The Web service 381 can then decide based on the information provided by the access evaluator Web service 387 whether to allow Web services 389A-389C representing one or more users to access the piece of content 326.

Figure 3R:
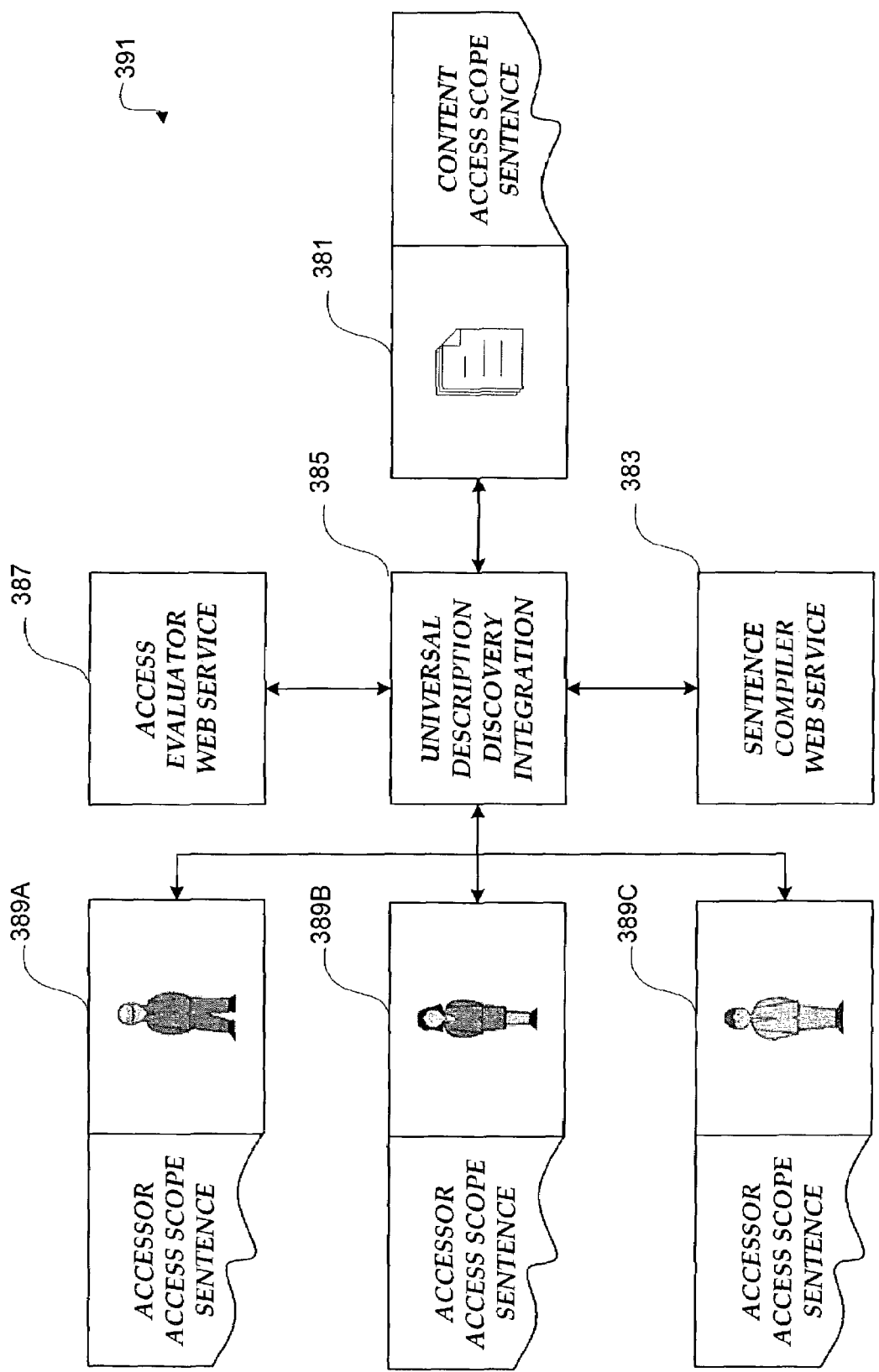
FIG. 3R is a block diagram illustrating a system of Web services for evaluating access to a piece of content, according to one embodiment of the present invention.
Figure 4A:
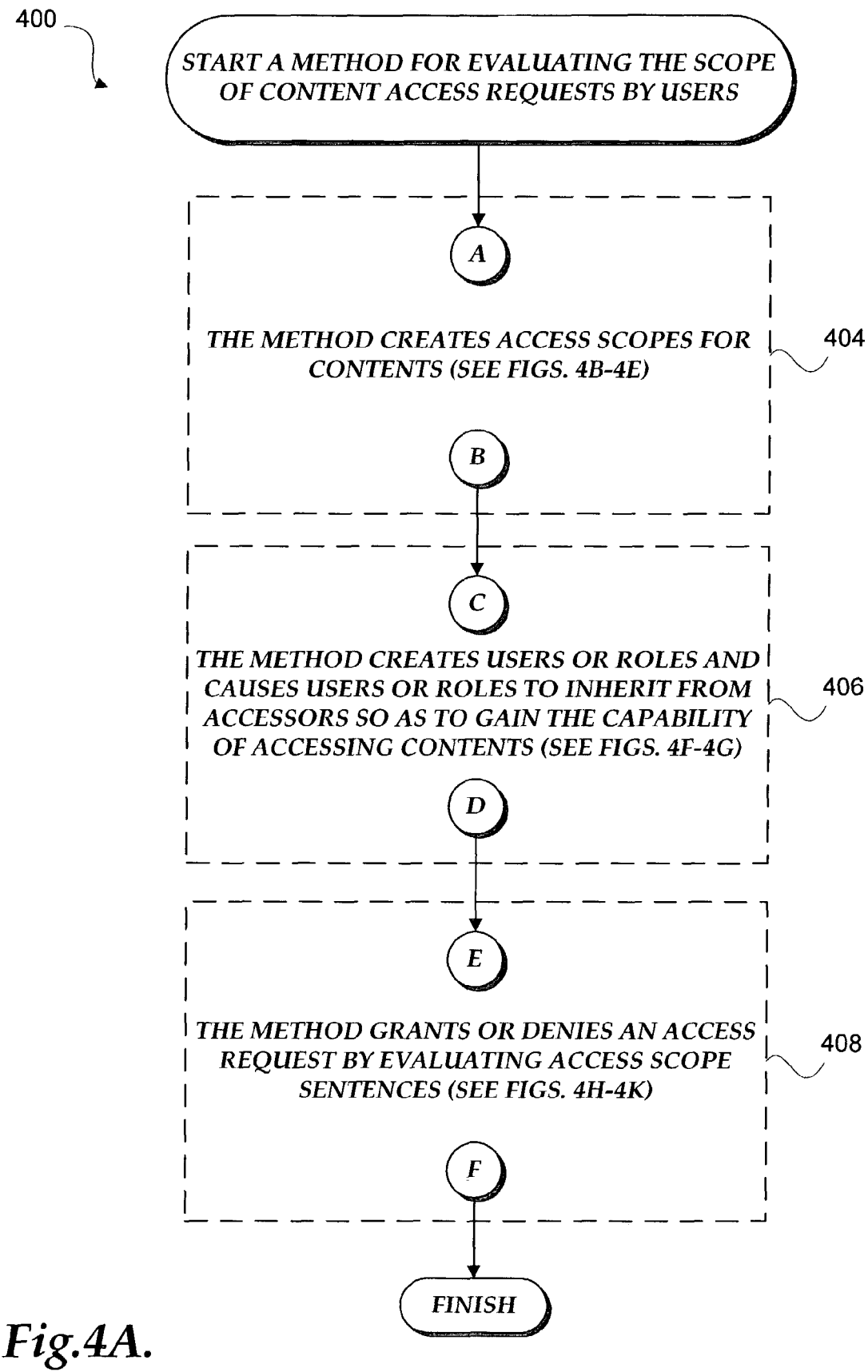
Figure 4B:
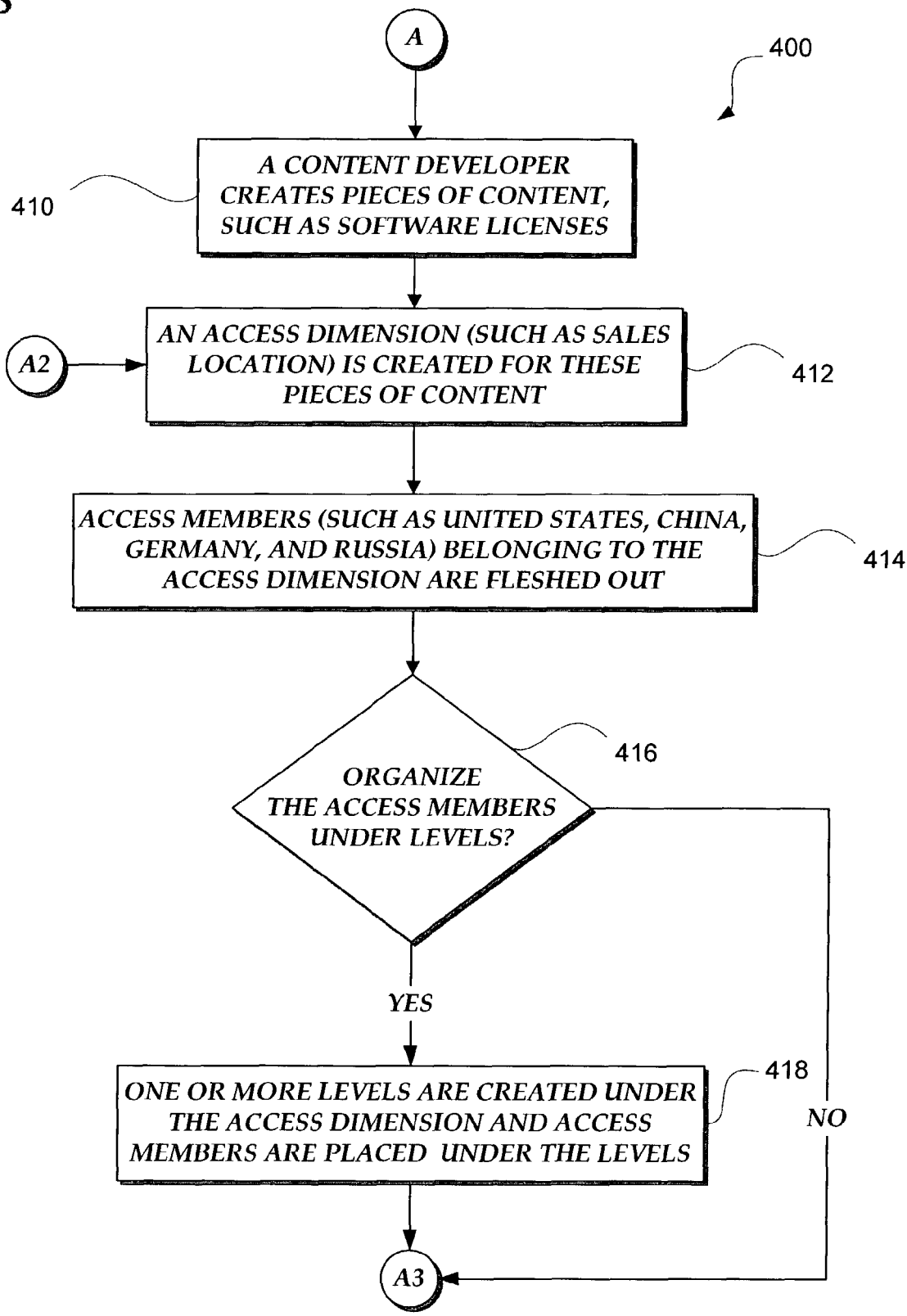
Figure 4C:
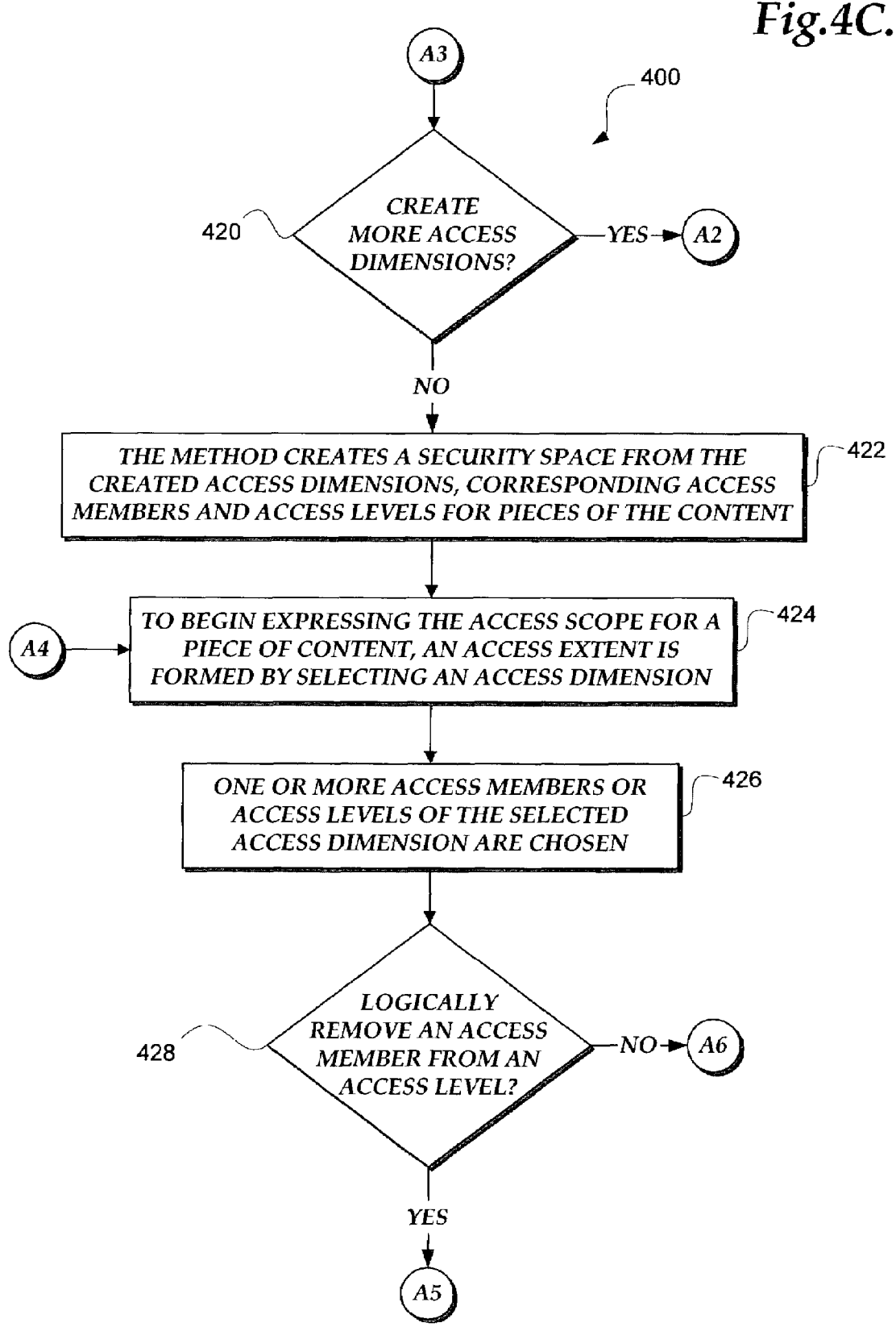
Figure 4D:
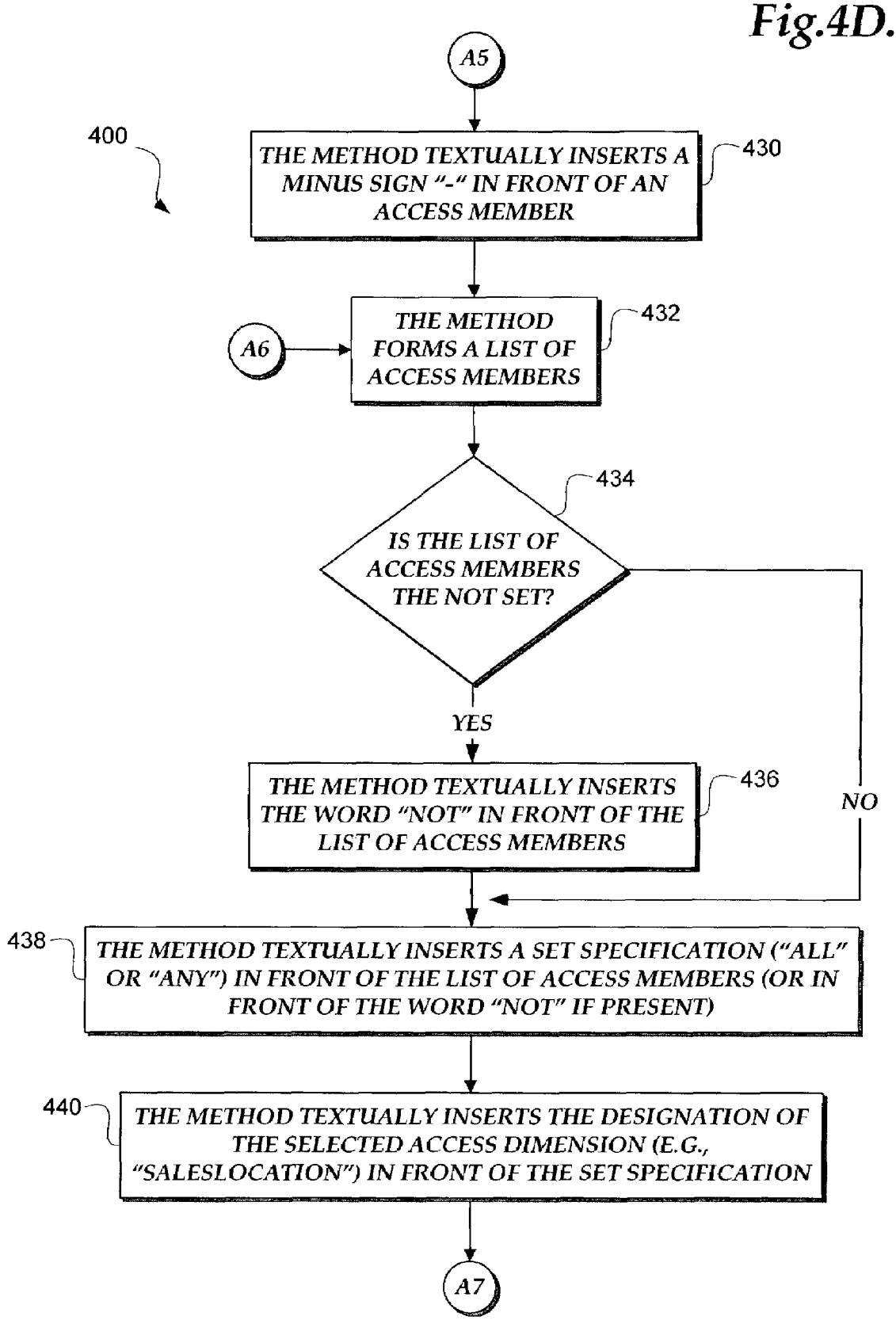
Figure 4E:
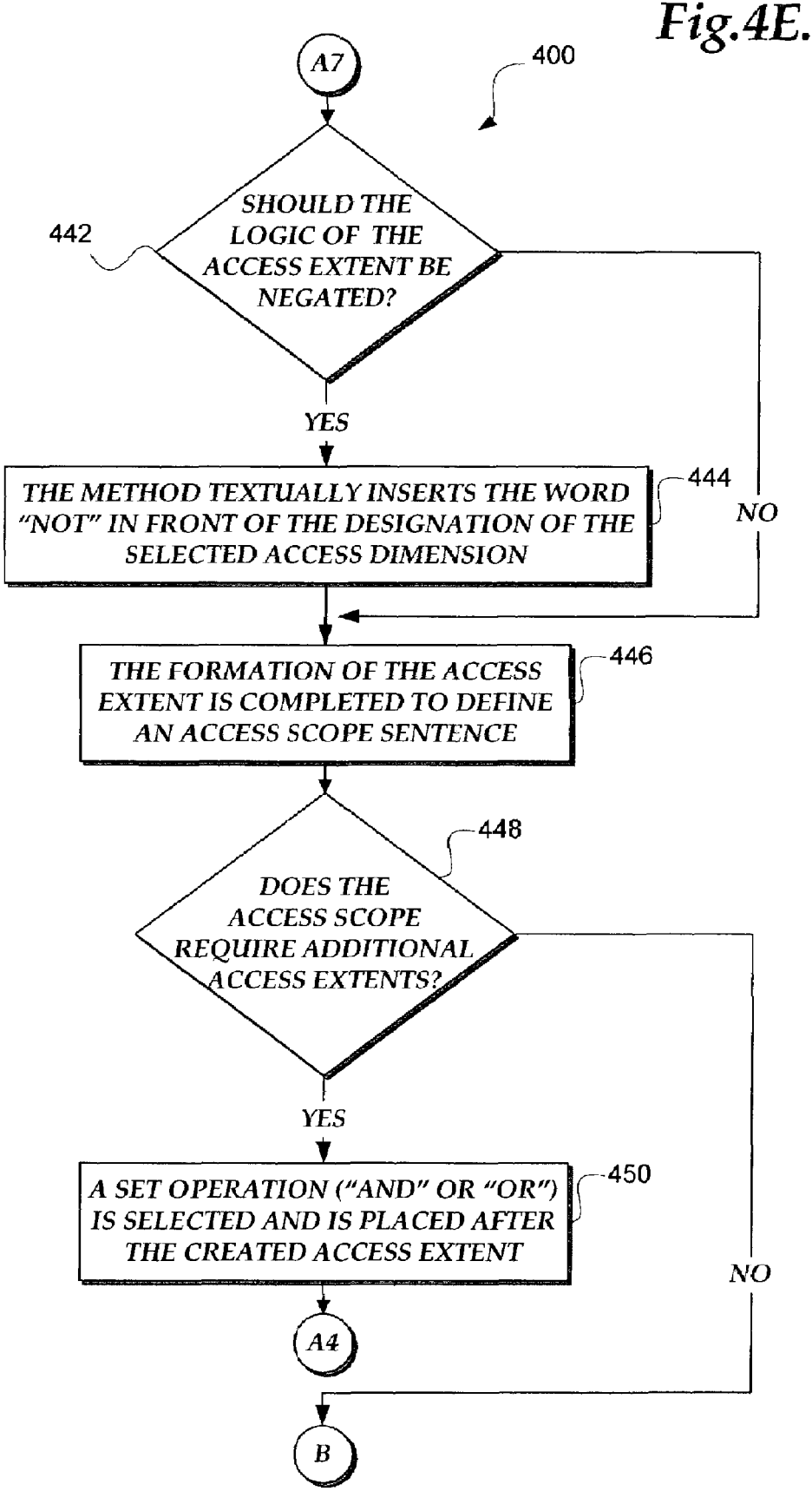
Figure 4F:
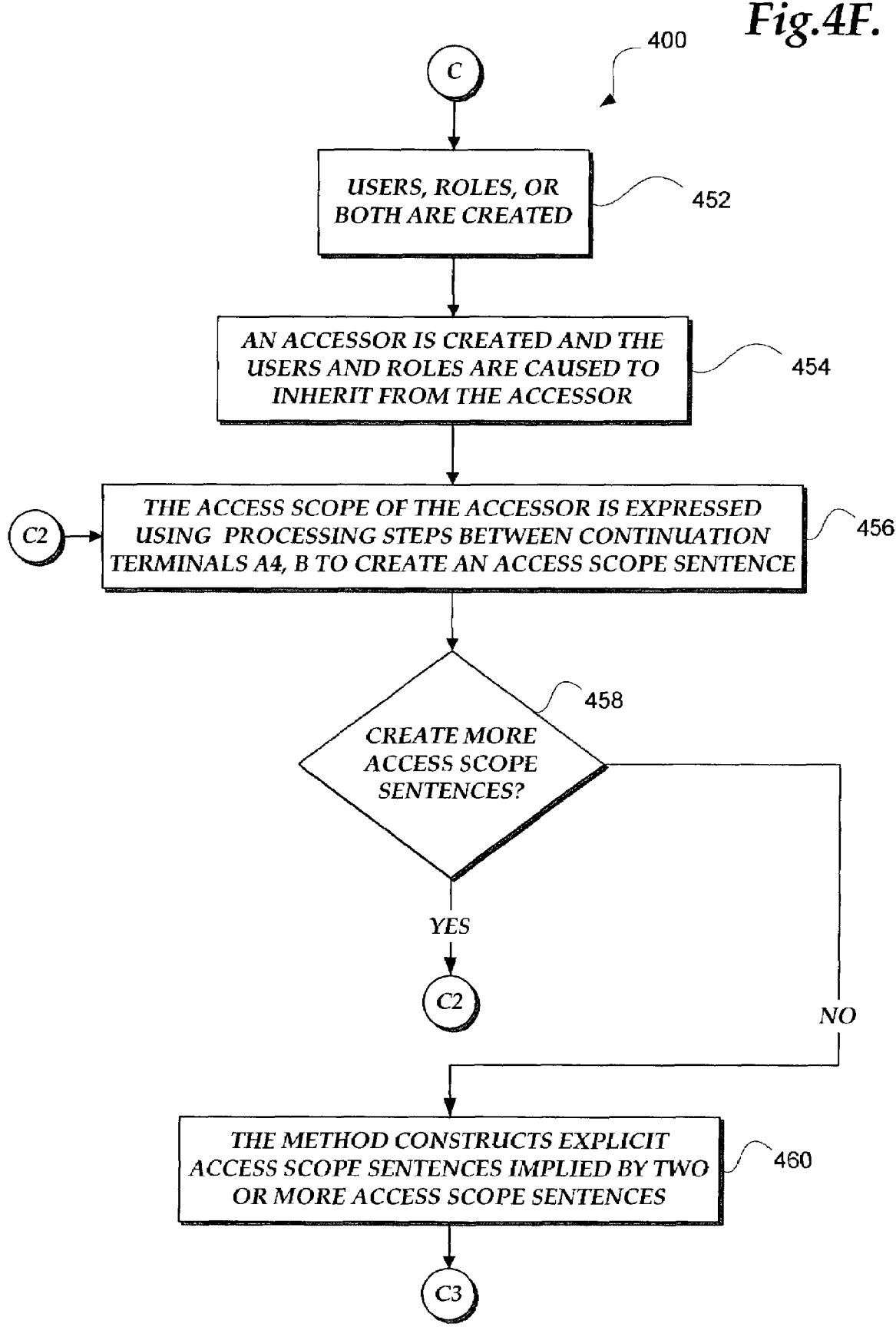
Figure 4H:
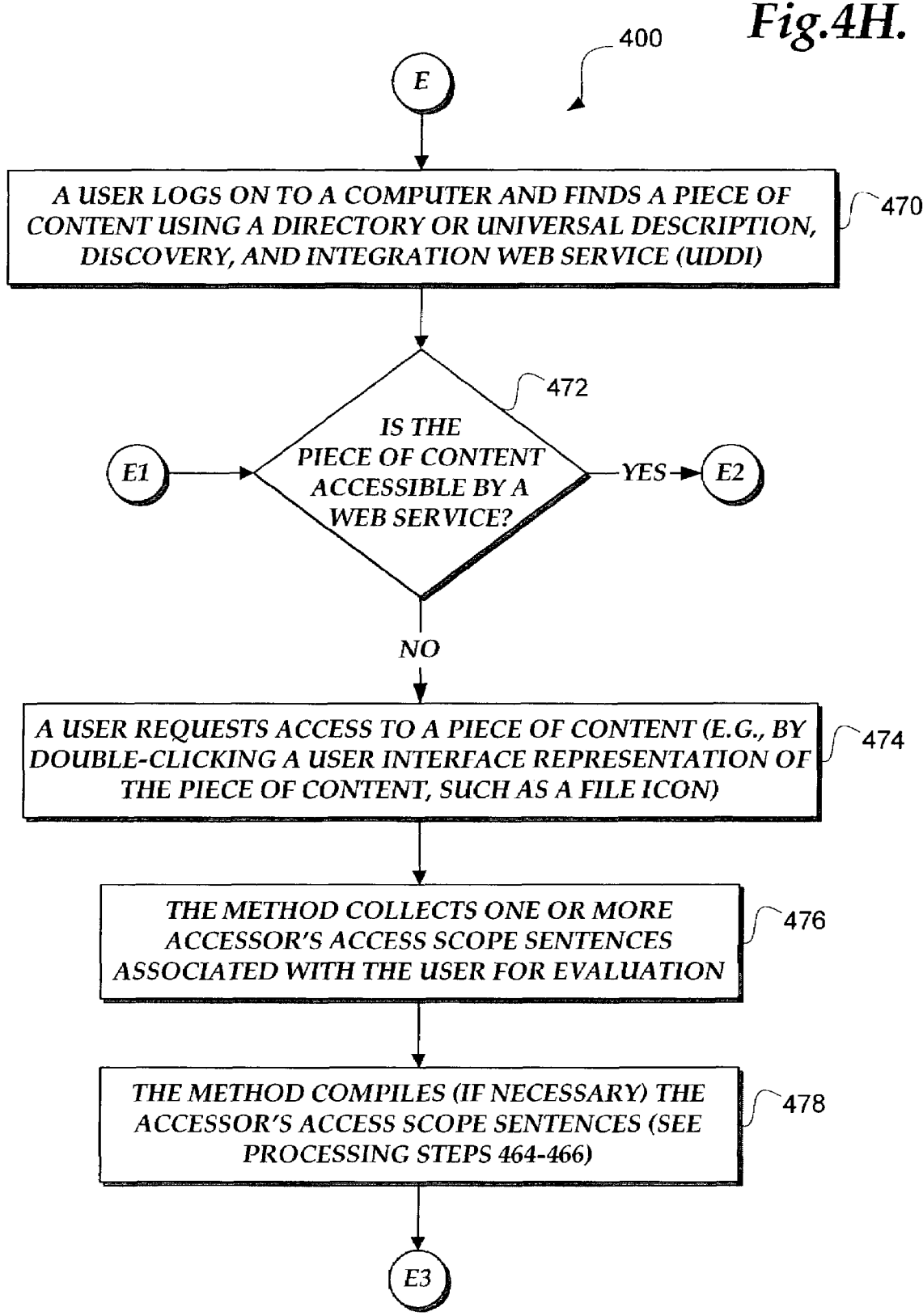
Figure 4I:
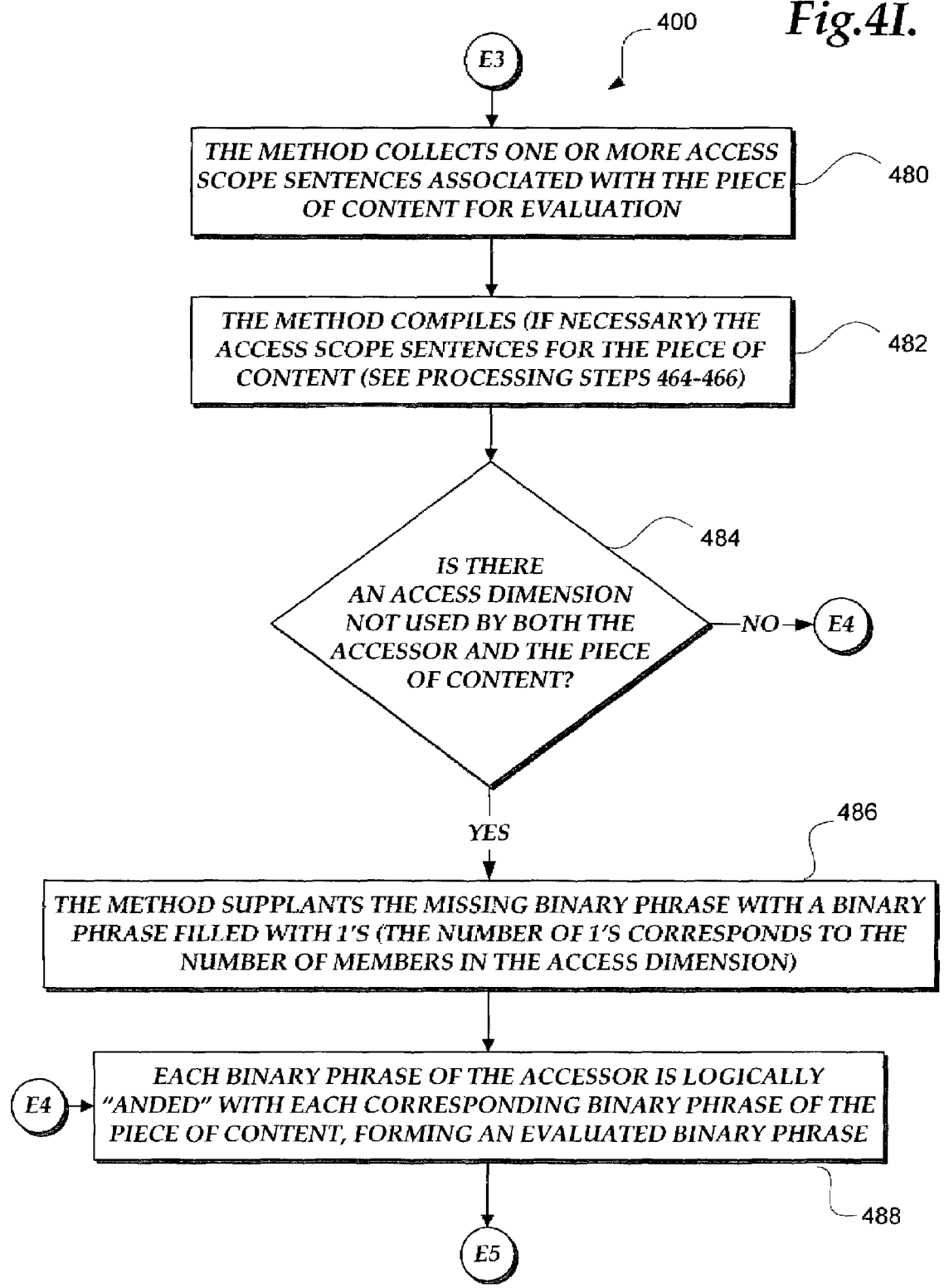
Figure 4J:
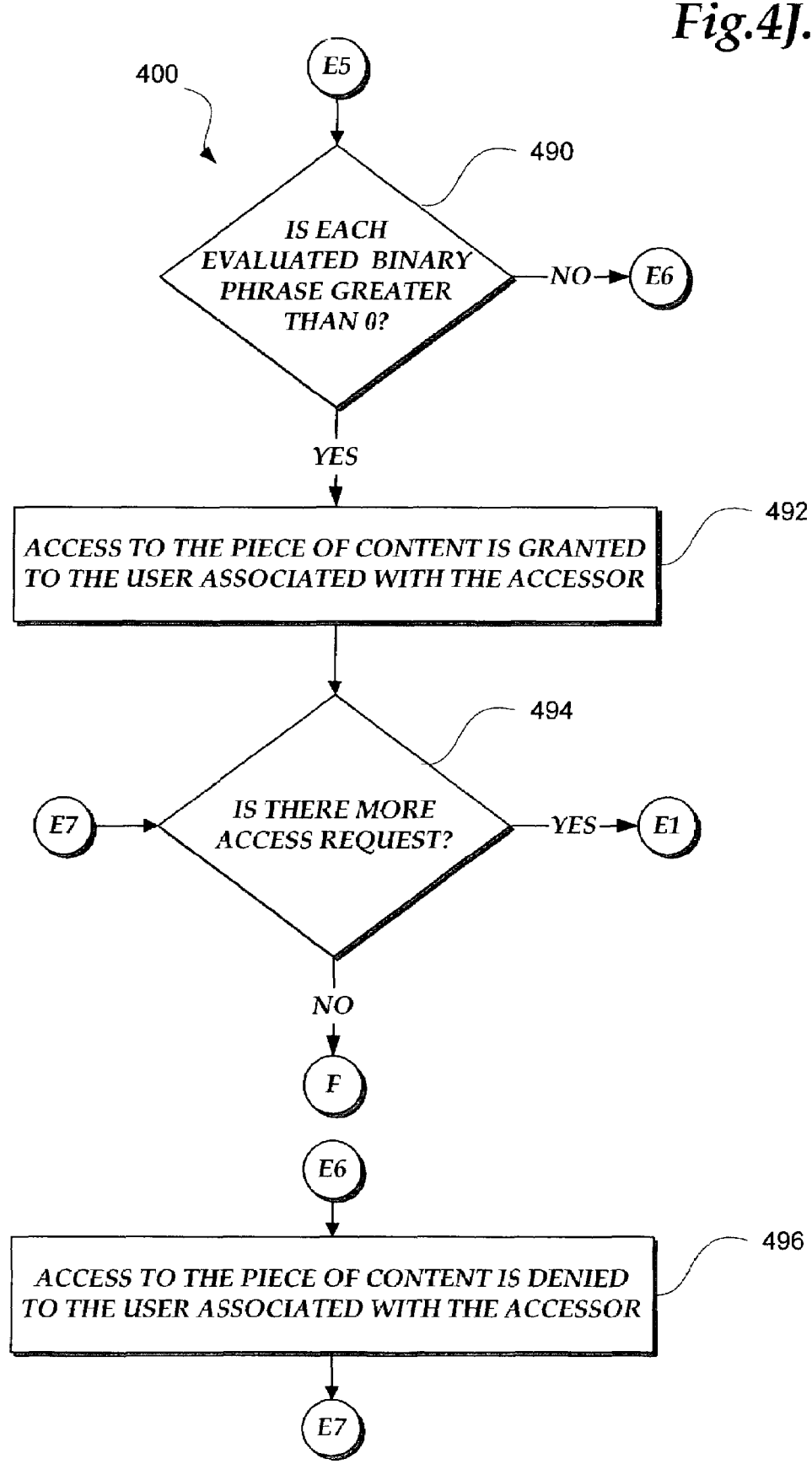

FIGS. 4A-4K illustrate a method 400 for evaluating the scope of content access requests by users. For clarity purposes, the following description of the method 400 makes references to various elements illustrated in connection with the system 316 (FIG. 3C), the security language 330 (FIG. 3E), the system 384 (FIG. 3L), and the system 391 (FIG. 3R).

From a start block, the method 400 proceeds to a set of method steps 404, defined between a continuation terminal ("terminal A") and an exit terminal ("terminal B"). The set of method steps 404 describes the creation of access scopes for content.

From terminal A (FIG. 4B), the method 400 proceeds to block 410 where a content developer creates pieces of content, such as software licenses. An access dimension (such as sales location) is created for these pieces of content. See block 412. Access members such as United States, China, Germany, and Russia, belonging to the access dimension, are fleshed out. (See col. 332CA, FIG. 3F). See block 414. The method 400 then proceeds to decision block 416 where a test is made to determine whether access members need to be further organized under levels. If the answer to the test at decision block 416 is YES, one or more levels are created under the access dimension and access members are placed under the levels. (See level "North America" defined between tags 338A, 338B, FIG. 3G.) See block 418. Next, the method 400 proceeds to another continuation terminal ("terminal A3"). If the answer to the test at decision block 416 is NO, the method 400 proceeds to terminal A3.

From terminal A3 (FIG. 4C), the method 400 proceeds to another decision block 420 where it is determined whether to create more access dimensions to define the security space 332, 334. If the answer to the test at decision, block 420 is, YES, the method 400 proceeds to another continuation terminal ("terminal A2") where the method 400 loops back to block 412 and repeats the processing steps described above. Otherwise, the answer to, the test at decision block 420 is NO, and the method creates security space 332, 334 from the created access dimensions (such as sales locations, licensing program, customer type, and agreement type); corresponding access members; and access levels for pieces of the content. See block 422. To begin expressing the access scope for a piece of content, such as the piece of content 326, an access extent is formed by selecting an access dimension. See block 424. One or more access members or access levels of the selected access dimension are then chosen. See block 426.

Next, the method 400 proceeds to another decision block 428 where it is determined whether to logically remove an access member from an access level. If the answer to the test at decision block 428 is YES, another continuation terminal ("terminal A5") is entered by the method 400. Otherwise, the answer is NO, and the method 400 proceeds to another continuation terminal ("terminal A6").

From terminal A5 (FIG. 4D), the method 400 proceeds to block 430, where the method 400 textually inserts a minus sign "–" in front of an access member. For example, an access extent may be defined as follows "SALESLOCATION ANY (NORTHAMERICA, -UNITEDSTATES)". This means that the member United States will be removed from the level North America leaving only Canada as a member. The method 400 then forms a list of access members 432. Next, at decision block 434, it is determined whether the list of access members is the not set. If the answer to the test at decision block 434 is YES, the method 400 textually inserts the word "NOT" in front of the list of access members. See block 436. The method 400 then proceeds to block 438. If the answer to the test at decision block 434 is NO, the method 400 also proceeds, to block 438 where the method 400 textually inserts a set specification ("ALL" or "ANY") in front of the list of access-members (or in front of the word "NOT" if present). The method 400 then textually inserts the designation of the selected access dimension (e.g., "sales location") in front of the set specification. See block 440. The method 400 then proceeds to another continuation terminal ("terminal A7").

From terminal A7 (FIG. 4E), the method 400 proceeds to decision block 442 where it is determined whether the logic of the access extent should be negated. If the answer is YES, the method 400 textually inserts the word "NOT" in front of the designation of the selected access dimension. See block 444. The method 400 then proceeds to block 446. If the answer to the test at decision block 442 is NO, the method 400 also proceeds to block 446 where the formation of the access extent is completed to define an access scope sentence. Next, a test is made at decision block 448 to determine whether the access scope requires additional access extents. If the answer is YES, a set operation ("AND" or "OR") is selected and is placed after the created access extent. See block 450. The method then proceeds to another continuation terminal ("terminal A4"). From terminal A4 (FIG. 4C), the method 400 loops back to block 424 where the processing steps described above are repeated. If the answer to the test at decision block 448 is NO, then method 400 continues to the exit terminal.

From terminal B (FIG. 4A), the method 400 proceeds to a set of method steps 406, defined between a continuation terminal ("terminal C") and an exit terminal ("terminal D"). The set of method steps 406 describes the creation of users or roles and causes users or roles to inherit from accessors so as to gain the capability of accessing content.

From terminal C (FIG. 4F), the method 400 proceeds to block 452 where users, roles, or both are created. (FIGS. 3A, 3B describe class diagrams 300A, 300B regarding the creation and association of users and roles.) An accessor is created and the users and roles are caused to inherit from the accessor. See block 454 (and see FIG. 3B showing the accessor class 314). Next, the method 400 proceeds to block 456 where the access scope of the accessor is expressed using processing steps between continuation Terminals A4, B to create an access scope sentence. A test is made to determine whether to create more access scope sentences. See decision block 458. If the answer to the test at decision block 458 is YES, the method 400 proceeds to another continuation terminal ("terminal C2"), where the method 400 loops back to block 456 and the above-described processing steps are repeated.

If the answer to the test at decision block 458 is NO, the method 400 constructs explicit access scope sentences implied by two or more access scope sentences. See block 460. An example of this is the sentence 382, which is formed from a permutation of sentences 376A, 376B. The method 400 then continues on to another continuation terminal ("terminal C3").

From terminal C3 (FIG. 4G), a test is made to determine whether to compile the access scope sentence. See decision block 462. If the answer is YES, the method 400 translates each selected access dimension in the access scope sentence into a binary phrase in base-2 (e.g., a bit mask). See block 464. The method 400 then compiles the access scope sentence in base-2 using the translated binary phrases along with the logical operators ("+" for "OR" and "&" for "AND"). See block 466. From there, the method 400 proceeds to block 468. If the answer to decision block 462 is NO, the method 400 also proceeds to block 468 where the method 400 associates the access scope sentence with the accessor, such as the accessor class 314. The method 400 then enters exit terminal D.

From terminal D (FIG. 4A), the method 400 proceeds to a set of method steps 408, defined between a continuation terminal ("terminal E") and an exit terminal ("terminal F"). The set of method steps 408 grants or denies an access request by evaluating access scope sentences.

From terminal E (FIG. 4H), the method 400 allows a user to log on to a computer and find a piece of content, such as the content 326, using a directory or a Universal Description, Discovery and Integration Web service (UDDI). See block 470. A test is made to determine whether the piece of content is accessible by a Web service. See decision block 472; If the answer is YES, the method 400 continues to another continuation terminal ("terminal E2"). Otherwise, the answer to the test at decision block 472 is NO, and the method 400 allows the user to request access to a piece of content (e.g., by double-clicking a user interface representation of the piece of content, such as a file icon). See block 474. Next, the method 400 proceeds to blocks 476 where the method 400 collects one or more accessor's access scope sentences associated with the user for evaluation. The method 400 then compiles (if necessary), the accessor's access scope sentences (processing steps 464-466). See block 478. The method 400 then proceeds to another continuation terminal ("terminal E3").

From terminal E3 (FIG. 4I), the method 400 proceeds to block 480 where the method collects one or more access scope sentences associated with the piece of content for evaluation. See block 480. The method then compiles (if necessary) the access scope sentences for the piece of content (processing steps 464-466). See block 482. A test is then made to determine whether there is an access dimension not used by both the accessor and the piece of content. See decision block 484. If the answer is NO, the method 400 proceeds to another continuation terminal ("terminal E4"). If the answer to the test at decision block 484 is YES, the method 400 supplants the missing binary phrase with a binary phrase filled with 1's. (The number of 1's corresponds to the number of members in the access dimension.) See block 486. Each binary phrase of the accessor is logically "ANDed" with each corresponding binary phrase of the piece of content, forming an evaluated binary phrase. See block 488. The method 400 then proceeds to another continuation terminal ("terminal E5").

From terminal E5 (FIG. 4J), the method 400 proceeds to decision block 490 where a test is made to determine whether each evaluated binary phrase is greater than 0. If the answer is NO, the method 400 proceeds to another continuation terminal ("terminal E6"). If the answer to the test at decision block 490 is YES, access to the piece of content, such as the piece of content 326, is granted to the user associated with the accessor. See block 492. Another test is made at decision block 494 to determine whether there are more access requests. If the answer is YES, another continuation terminal ("Terminal E1") is entered by the process 400 which loops back to decision block 472 where the above-identified processing steps are repeated. Otherwise, the answer is NO, and the exit terminal F is entered by the method 400.

From terminal E6 (FIG. 4J), the method 400 proceeds to block 496 where access to the piece of content is denied to the user associated with the accessor. The method 400 then proceeds to another continuation terminal ("terminal E7"). From Terminal E7 (FIG. 4J), the method 400 loops back to decision block 494 where the above-described processing steps are repeated.

From terminal E2 (FIG. 4K), the piece of content, uses UDDI to find a compiler Web service such as the sentence compiler Web server 383, to compile access scope sentences (processing steps 464-466). See block 498. The piece of content also uses UDDI to find an evaluator Web service, such as the access evaluator Web service 387, to evaluate access (processing steps 474, 496). See block 499. The method 400 then enters exit terminal F and terminates execution.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A networked system for accessing a piece of content, comprising:
   a user Web service hosted on a first web server and configured to represent a user having an expressed user access scope, the expressed user access scope being expressed in an accessor sentence containing dimensional extents of a security space;
   a content Web service hosted on a second web server and configured to represent the piece of content having an expressed content access scope, the expressed content access scope being expressed in a content sentence containing dimensional extents of the security space; and
   a translator configured to translate the accessor sentence and the content sentence into binary sentences, the user Web service communicating with the content Web service via a network to access the piece of content when the expressed user access scope overlaps with the expressed content access scope as determined from the binary sentences.

2. The networked system of claim 1, wherein the translator includes a compiler Web service for compiling the accessor sentence and the content sentence into the binary sentences, each binary sentence comprising binary phrases.

3. The networked system of claim 2, further comprising an evaluator Web service for comparing the accessor sentence and the content sentence to determine whether to grant access to the user Web service so that the user Web service can access the piece of content.

4. A computer-implemented method for evaluating the scope of a content access request by a user, the method comprising:
   requesting a discovery framework by a user Web service hosted on a first web server to access a piece of content represented by a content Web service hosted on a second web server;
   notifying the content Web service by the discovery framework of the access request by the user Web service;
   translating a user access scope sentence and a content access scope sentence by a sentence translator into binary sentences; and
   requesting the discovery framework by the content Web service for an access evaluator Web service to evaluate whether an access scope of the user Web service overlaps with an access scope of the content Web service as determined from the binary sentences to grant access to the piece of content, the access scope of the user Web service being conveyed in a first expression independently from a second expression that conveys the access scope of the content Web service, the access scope of the user Web service being expressed by the first expression in a user access scope sentence containing dimensional extents of a security space and the access scope of the content Web service being expressed in a content access scope sentence containing dimensional extents of the security space.

5. The method of claim 4, wherein translating includes compiling the user access scope sentence and the content access scope sentence by a sentence compiler Web service into the binary sentences, each binary sentence having binary phrases, each binary phrase being a compiled dimensional extent.

6. The method of claim 5, further comprising evaluating the binary sentences by the access evaluator Web service, the act of evaluating including comparing each binary phrase of a first binary sentence with each corresponding binary phrase of a second binary sentence to form a resultant binary sentence.

7. The method of claim 6, further comprising granting access to the user Web service if each binary phrase of the resultant binary sentence is greater than zero.

8. The method of claim 7, further comprising denying access to the user Web service if one binary phrase of the resultant binary sentence is equal to zero.

9. A tangible and storable computer-readable medium having computer-readable instructions that implement a method for evaluating the scope of a content access request by a user, the method comprising:

requesting a discovery framework by a user Web service to access a piece of content represented by a content Web service, an access scope of the user Web service being expressed in a user access scope sentence containing dimensional extents of a security space and an access scope of the content Web service being expressed in a content access scope sentence containing dimensional extents of the security space;

notifying the content Web service by the discovery framework of the access request by the user Web service;

translating the user access scope sentence and the content access scope sentence by a sentence translator into binary sentences; and requesting the discovery framework by the content Web service for an access evaluator Web service to evaluate whether the access scope of the user Web service overlaps with the access scope of the content Web service as determined from the binary sentences to grant access to the piece of content.

10. The method of claim 9, wherein translating includes compiling the user access scope sentence and the content access scope sentence by a sentence compiler Web service into the binary sentences, each binary sentence having binary phrases, each binary phrase being a compiled dimensional extent.

11. The method of claim 10, further comprising evaluating the binary sentences by the access evaluator service, the act of evaluating including comparing each binary phrase of a first binary sentence with each corresponding binary phrase of a second binary sentence to form a resultant binary sentence.

12. The method of claim 11, further comprising granting access to the user Web service if each binary phrase of the resultant binary sentence is greater than zero.

13. The method of claim 12, further comprising denying access to the user Web service if one binary phrase of the resultant binary sentence is equal to zero.

* * * * *

UNITED STATES PATENT AND TRADEMARK OFFICE
CERTIFICATE OF CORRECTION

PATENT NO. : 7,653,936 B2  Page 1 of 1
APPLICATION NO. : 10/606624
DATED : January 26, 2010
INVENTOR(S) : Shawn Oberst It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1617 days.

Signed and Sealed this

Twenty-third Day of November, 2010

David J. Kappos
*Director of the United States Patent and Trademark Office*